United States Patent
Miquel et al.

(10) Patent No.: US 6,799,823 B2
(45) Date of Patent: Oct. 5, 2004

(54) REMOVAL OR MITIGATION OF ARTIFACTS IN INCREMENTAL PRINTING

(75) Inventors: Antoni Gil Miquel, Barcelona (ES); Cristina Crespi, Sant Cugat del Valles (ES); Francisco Guerrero, Barcelona (ES); Santiago Garcia Reyero, Girona (ES); Sascha de Peña, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/236,612

(22) Filed: Sep. 5, 2002

(65) Prior Publication Data

US 2004/0046816 A1 Mar. 11, 2004

(51) Int. Cl.[7] .................................................. B41J 2/205
(52) U.S. Cl. ............................ 347/15; 347/41; 358/1.9
(58) Field of Search .............................. 347/15, 41, 14, 347/19, 9, 43, 16; 358/1.9, 502, 1.2

(56) References Cited

U.S. PATENT DOCUMENTS 4,272,771 A * 6/1981 Furukawa .................... 347/12
6,296,343 B1 * 10/2001 Alfaro ........................ 347/43
2001/0030757 A1 10/2001 Nagatani et al.

FOREIGN PATENT DOCUMENTS

| EP | 0430451 | 6/1991 |
|----|---------|--------|
| EP | 0532302 | 3/1993 |
| EP | 0645246 | 3/1995 |
| EP | 0998117 | 5/2000 |
| EP | 1197916 | 4/2002 |

* cited by examiner

Primary Examiner—Lamson D Nguyen
(74) Attorney, Agent, or Firm—Peter I. Lippman

(57) ABSTRACT

One aspect of the invention lowers boundary artifacts by depleting selectively at a boundary, only in high-color-saturation areas. In another aspect, printmasking defines depletion regions. In yet another, a printer treats different drop-to-pass allocations as of opposite sign. Some preferred embodiments exploit the multilayer Shakes mask system: each mask represents a number of drops to fire, and masks are additive, depending on image content. In preferred embodiments the high-value mask is used in opposition, reducing the number of drops to fire. Bits are set in this mask at pixels close to boundaries, to define depletion regions that negate artifact-causing boundary coalescence. An adaptive version measures nonuniformity in an area-fill test pattern, and uses results to define localized depletion bits for high-value mask(s).

34 Claims, 6 Drawing Sheets

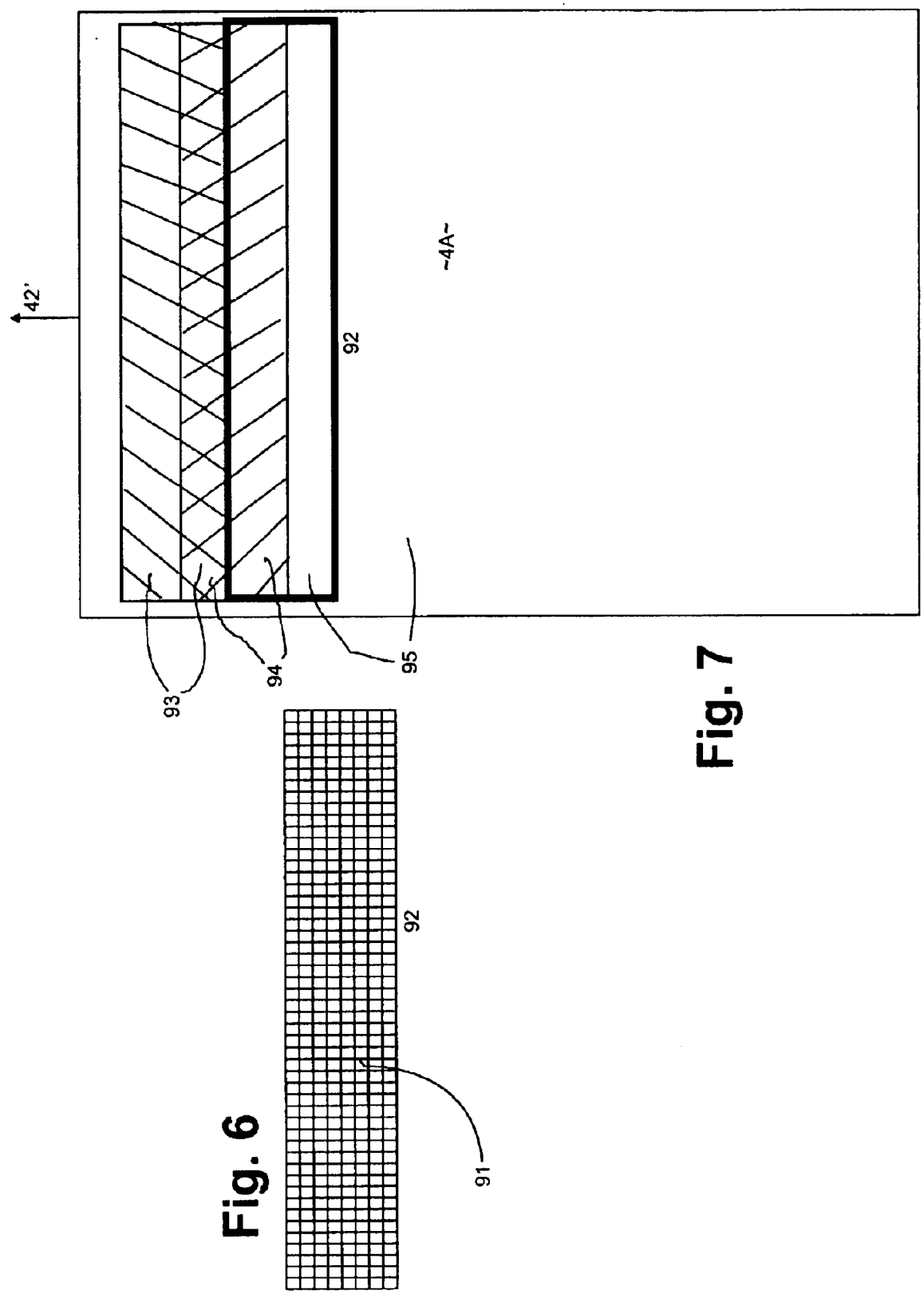

REMOVAL OR MITIGATION OF ARTIFACTS IN INCREMENTAL PRINTING

RELATED PATENT DOCUMENTS

Closely related documents are other, coowned U.S. utility-patent documents—hereby wholly incorporated by reference into this document. Those documents are in the names of:

Thomas H. Baker et al., Ser. No. 09/183,819, "COLOR-CALIBRATION SENSOR SYSTEM FOR INCREMENTAL PRINTING", Francis Bockman and Guo Li, U.S. Pat. No. 6,178,008, "CONSTRUCTING DEVICE-STATE TABLES FOR INKJET PRINTING";

Ramon Borrell, Ser. No. 09/146,858, "ENVIRONMENTAL AND OPERATIONAL COLOR CALIBRATION, WITH INTEGRATED INK LIMITING, IN INCREMENTAL PRINTING", issued as U.S. Pat. No. 6,585,340; and Ser. No. 09/252,163, "PIXEL-DENSITY AUGMENTATION AND ADJUSTMENT WITH MINIMUM DATA, IN AN INCREMENTAL PRINTER" issued as U.S. Pat. No. 6,690,485;

Miquel Cluet et al., Ser. No. 09/642,418, "PRINTING AND MEASURING DIRECTLY DISPLAYED IMAGE QUALITY, WITH AUTOMATIC COMPENSATION, IN INCREMENTAL PRINTING", David Donovan and Miquel Boleda, Ser. No. 09/688,610, "APPARATUS AND METHOD FOR MITIGATING COLORANT-DEPOSITION ERRORS IN INCREMENTAL PRINTING", Jose-Julio Doval et al., provisional No. 60/179,383, then nonprovisional Ser. No. 09/693,524, "COMPENSATION FOR MARKING-POSITION ERRORS ALONG THE PEN-LENGTH DIRECTION, IN INKJET PRINTING", issued as U.S. Pat. No. 6,494,558;

Joan-Manel Garcia-Reyero et al., U.S. Pat. No. 6,443,556, "IMPROVEMENTS IN AUTOMATED AND SEMI-AUTOMATED PRINT-MASK GENERATION FOR INCREMENTAL PRINTING"—and earlier documents cited therein—as well as Ser. No. 09/150,321, "MASKS ON DEMAND FOR USE IN INCREMENTAL PRINTING",; and Ser. No. 09/150,322, "FAST BUILDING OF MASKS FOR USE IN INCREMENTAL PRINTING",; issued as U.S. Pat. No. 6,542,771, and Ser. No. 09/150,323, "OPTIMAL-SIZE AND NOZZLE-MODULATED PRINTMASKS FOR USE IN INCREMENTAL PRINTING", Antoni Gil et al., Ser. No. 09/775,771, "EXTERNALLY CUSTOMIZED TONAL-HIERARCHY CONFIGURATION AND COMPLEMENTARY BUSINESS ARRANGEMENTS, FOR INKJET PRINTING", Pau Soler et al., Ser. No. 09/919,260, "COMPENSATING FOR DRIFT AND SENSOR PROXIMITY IN A SCANNING SENSOR, IN COLOR CALIBRATING INCREMENTAL PRINTERS", Francesc Subirada et al., U.S. Pat. No. 6,196,652, "SCANNING AN INKJET TEST PATTERN FOR DIFFERENT CALIBRATION ADJUSTMENTS"; and Ser. No. 09/766,514, "TEST-BASED ADVANCE OPTIMIZATION IN INCREMENTAL PRINTING: MEDIAN, SENSITIVITY-WEIGHTED MEAN, NORMAL RANDOM VARIATION", issued as U.S. Pat. No. 6,547,362; and Ser. No. 09/919,207, "LINEARIZATION OF AN INCREMENTAL PRINTER BY MEASUREMENTS REFERRED TO A MEDIA-INDEPENDENT SENSOR CALIBRATION",;

Ferran Vilanova et al., Ser. No. 09/935,499, "STREAMLINED REAL-TIME PRINTMASK REVISION, AND PRINTING-ELEMENT DATA SYSTEM, TO CIRCUMVENT ELEMENT MALFUNCTION", and Ser. No. 09/945,492, "CLOSED-LOOP COLOR CORRECTION USING LABORATORY-MEASURED COLOR CUTOFFS ANCHORED TO FIELD-MEASURED BLACK-AND-WHITE",;

Sascha de Pena Hempel et al., concurrent herewith, "REMOVAL OR MITIGATION OF ARTIFACTS IN COMPOSITE-COLOR INCREMENTAL PRINTING", later Ser. No. 10/237,195.

Also treating malfunctioning-nozzle recognition and compensation, but not incorporated by reference, is U.S. Pat. No. 6,010,205 of Donald Billet, with Raster Graphics.

FIELD OF THE INVENTION

This invention relates generally to machines and procedures for incremental printing of text or graphic images; and more particularly to removal of artifacts in liquid-colorant printing that constructs such images from individual colorant spots, formed in a two-dimensional pixel array on a printing medium such as paper, transparency stock, or other glossy media.

BACKGROUND

Incremental printing with liquid-base colorants is subject to several very subtle but undesired image defects. Although these arise in generally understood ways from operation of the associated mechanical components, they have nonetheless been very resistant to corrective action.

Many forms of incremental printing operate by creating inkdrop swaths. These swaths are formed in successively stepped positions, by iterated relative motion—along a print-medium advance direction—between the medium and an inking device. Such swath-based printing systems may be of a scanning type, operating by repeated operation of the inking devices across the medium, or a pagewide swath-height array type.

Some artifacts, even though due to different apparatus phenomena, are often designated by the generic term "banding"—meaning that they usually present the appearance of subtle bands, stripes or striations. This is particularly true for swath-based devices, or scanning devices—although artifacts of interest with respect to preferred embodiments of the invention are not limited to such systems.

The reason for this commonality with respect to banding artifacts is that almost any cyclical or near-cyclical perturbation of inking operations creates some form of correspondingly periodic visible pattern. Merely by way of example, features that appear in generally the same elevation across each swath naturally tend to produce a visual effect at the spatial periodicity of the printing-medium advance.

When printing with a single layer of swaths fitted edge-to-edge, that periodicity is in principle equal to the swath height. (Such an edge-to-edge arrangement is obtained through use of a so-called single-pass printing mode, for a scanning system—or more generally a single-inking-installment mode, to encompass a pagewide swath system.)

In plural-installment modes—i.e., with overlapping swaths—the spatial periodicity of the banding is finer. In these cases the print medium usually advances by some fraction of the swath height, giving rise to the finer banding.

Some types of banding—and, more generally, artifacts addressed by some forms of the present invention—are not fundamentally swath-related at all. Again merely by way of example are those artifacts arising from tiled relatively small printmasks (discussed below).

Such artifacts are most conspicuous in midtone regions of an image, where there is modulation range in either direction to exhibit extremely subtle patterns. Other artifact types, for example those associated with slight overinking effects (also discussed below), are instead most conspicuous in darker regions where colorant liquid effects can dominate.

(a) Boundary banding—One of the major contributors to banding is a thin, darker line that appears along one or usually all edges of a printed field. This is the so-called "boundary banding"; however, more generally it should be regarded as a boundary artifact.

In a swath-based system, some manifestations of this type of artifact appear to be concentrated particularly where two swath edges abut, or nearly abut. Boundary artifacts are very hard to remove—especially when printing in swaths, and especially at a low number of passes or installments.

Normally they appear only in image regions that are rather highly saturated calorimetrically. Such colorimetric saturation giving rise to boundary artifacts, however, occurs in either:

- a single primary colorant (ordinarily cyan, magenta, yellow and black), or
- a composite color formed from combinations of those colorants in various proportions.

Accordingly this localization of the banding is believed to be a liquid-loading effect—coalescence of the liquid in adjacent inkdrops, concentrated by surface tension at the edges of the just-deposited liquid field.

Boundary artifacts are hard to attack when associated with heavy inking in one primary. This difficulty is exacerbated when the overinking takes the form of an aggregation, with only modest contributions from plural colorants as in the case of composite colors.

Another form of banding—along horizontal boundaries only—arises from swath-height error ("SHE", and sometimes "SWE") rather than coalescence. It will be discussed below.

(b) Other swath-associated artifacts—One distinctly different kind of image defect, although it too strongly affects contiguous-swath abutments, relates to swath-height error. This type of error usually occurs when nominal relationships between swath height 135 (FIG. 1A) and printing-medium advance 133 fail.

In the nominal relationship, when the effective pen height 135 just matches the advance distance 133, swaths 131, 132 abut neatly 134. For nominal advance, such relationships are maintained when ink-discharging nozzles near the inking-array edge are pointed straight toward the printing medium 130 along a normal to the surface.

When those end nozzles instead point outboard or inboard—along the print-medium advance direction—such misdirections cause the swath to be taller 135' or shallower 135", respectively, than its nominal height 135. In the former case, for a nominal print-medium advance stroke 133, excess lengths 136, 137 at top and bottom, respectively, of overlong adjacent swaths 131', 132' then overlap slightly. The overlap forms a dark line 134' (FIG. 1B) along the swath boundary.

In the opposite case of inboard-pointing end nozzles causing shallower swaths 135", the foreshortened regions 138, 139 at top and bottom, respectively, of the undersize adjacent swaths 131", 132" fail to abut at all. The failure 134" to abut, leaves a white line 134" (FIG. 1C) between the swaths.

In practice, these conditions arise also with nominal swath height, for short stroke and long stroke respectively. (If the only problem is inaccurate stroke, however, then correction is straightforward and easy.)

Through fine adjustment of the advance stroke, this kind of mismatch between stroke and swath height can be hidden, for some one particular magnitude of nozzle-direction error, but not entirely cured. The previously introduced patent documents of Cluet, Donovan and Doval, Vilanova '499 and particularly Subirada '652, introduce various techniques for attacking this problem—and other errors related to nozzle health, taken up shortly.

Generally speaking such techniques also require printing and measurement of test patterns designed to reveal details of the banding characteristics to be overcome. Measurements of this sort are facilitated by apparatus and methodology introduced in several related patent documents, particularly those of Baker, Bockman, Borrell (Ser. No. '858), Soler, Subirada and Vilanova '207—as well as the three others noted in the preceding paragraph.

Unfortunately, however, stroke adjustment either foreshortens or lengthens, respectively, the overall image. The image is typically made a significant fraction of one percent too tall or short.

Worse, such a corrective tactic cannot restore image detail that is either blurred or lost, respectively, as the abutment region is distorted in height relative to areas within the swath. Even worse yet is the inability of such strategies to accommodate more than just one particular magnitude of directional error, when in fact each color in an image is printed from a respective different inking array—i.e., printhead, or so-called "pen".

For instance suppose that in a particular printer one of these pens prints, in one color, a swath 131" that is 0.3% too shallow 135"—while another pen makes, in a second color, a swath 131' that is 0.4% too tall 135'. These two arrays, and their respective two color swaths 131", 131', are intrinsically out of register with each other by approximately 0.7%. Any attempt to adjust the stroke 133 to hide swath-height lengthening error 136, 137 or foreshortening error 138, 139 in either of the two colors must necessarily worsen the effect for the other.

In a modern system there are at least four pens. The likelihood of significant mismatch between two is accordingly sizable. Although in principle pens can be sorted into matched sets, doing so increases cost—and in any event the ink is generally exhausted from one pen faster than another, so that the practical usefulness of such an approach is limited.

These problems are particularly severe in single-pass (single-installment) printing modes. For instance abutment failure 134" between two swaths in a particular color leaves an unprinted strip all the way across the image.

If other colors happen to be unused in that region of the image, that unprinted strip is white. The effect is often very conspicuous even if other colors are present, especially since the unprinted strip repeats at intervals equal to the advance stroke. Like boundary artifacts, this type of error is maximally obtrusive when occurring in a highly saturated field of a dark color.

Another type of artifact can arise from an error type that is related to swath-height error: nozzle pointing errors of uncorrelated magnitude and sign, in the advance axis but within the swath rather than at the ends. As adjacent nozzles in different segments along a nozzle column can point either toward or away from each other, results typically include both underinked and overinked strips, respectively.

Thus, like swath-height error but unlike boundary artifacts, these internal pointing errors can create faded or unprinted zones as well as overly dark zones. Unlike both the boundary artifacts and swath-height errors discussed above, these pointing errors naturally are not localized at swath boundaries.

Further, these artifacts may be either isolated from one another or closely grouped, depending entirely on all the conditions of the nozzle array. The entire striation pattern, however, as with those two above-discussed errors, does repeat at intervals equal to the medium-advance stroke.

Still another error source is somewhat related to internally misdirected nozzles: incorrect inkdrop size, or an extreme case of it—total nozzle failure. Inkdrop size can vary due, for example, to low or high firing energy, or to the mechanical characteristics of a heater resistor or a nozzle as manufactured, or to plugging or other degradation of a nozzle through use.

Resulting striations, like those due to internal pointing error, can be either light or dark. They can also be either isolated or clustered within a swath.

Banding artifacts due to swath-height errors, internal pointing errors and inkdrop size errors alike may be classed as "area fill nonuniformity". Such nonuniformity, observed in printmodes with enough passes to conceal boundary artifacts, is mainly generated by a combination of various swath-height errors.

Heretofore a primary strategy for reducing area-fill nonuniformity is adjustment of the advance stroke. The strategy includes selecting an optimum stroke that maximizes image quality. Each pen, however, has its own, different nozzle profile—ideally leading to a specific stroke value for that particular pen.

Under these circumstances, precise compensation of all the pens with just one advance is not possible. The best that can be done is a compromise, and obtaining an ideal compromise requires an advanced and somewhat elaborate procedure.

Such a procedure takes into account characteristics of the printing medium as well as the banding appearance. The procedure also incorporates decisional algorithms to determine the optimized compromise advance for each swath. These requirements also in effect build another kind of compromise between image-quality improvement and throughput loss.

(c) Swath-independent over- and underinking—These topics relate to excess or inadequate inking that is not localized with respect to a swath—but rather only arises through relatively extreme color-saturation requirements in an image. Accordingly these problems, as will be seen, are only tangentially related to this document.

To achieve vivid colors in printing with liquid inks, and to substantially fill the white space between addressable pixel locations, ample quantities of ink must be deposited. Doing so, however, requires subsequent removal of the liquid base—by evaporation (and, for some printing media, absorption)—and this drying step can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium.

In a sense these excess-liquid problems arise because colorant quantities are determined from colors specified in an image file, which are developed without regard for inking—especially for aggregate liquid—needed to implement those colors. Such color specifications are created by artists, or derived from photographs or other preexisting images, none of which takes into the account the liquid loading associated with all colorants in the aggregate.

Various techniques are known for use together to moderate these adverse drying-time effects and bulk- or gross-colorant effects. It is helpful to bear in mind, however, that the overall total amount of ink in a region should be actually reduced only as a last resort, since all this ink is what is appropriate for the desired color.

An opposite sort of problem arises when geometrical relationships between ink dots and pixels prevent attainment of linearity in actual color saturation—even though nominally full inking is specified by an image file. This phenomenon, as described at length in the Borrell Ser. No. '163 document mentioned earlier, results in inadequate apparent visual saturation of colors in image areas that are fully inked.

Once again this particular form of underinking is not at all localized with respect to printheads or swaths. Rather, it transcends such mechanical phenomena, and relates strictly to image color considerations.

(d) Depletion and propletion—The excess-liquid deposition described above is managed by a process called "depletion", long a familiar one in inkjet printing. This process pauses to correct the absence of aggregate-liquid accounting in the original development of color specifications for an image.

Thus the depletion process typically includes adding the numbers of drops of all colorants at a pixel, and preferably considering the average of such drop count over some practically determined local area. When the resulting quantity exceeds a threshold established through experience with the printing medium, humidity and such considerations related to drying speed, the process may conclude with modification of the derived inking data.

This modification consists of reducing the drop count, usually in such a way as to exert minimal degradation of color accuracy. This condition, however, is a difficult one—since composite-color hue is very sensitive to colorant proportions, and even the brightness of primary colors is sensitive to the amount of colorant deposited.

Concern for such vividness, or at least its linear response in true visual terms, is at the heart of the Borrell '163 document. Borrell provides for addition of ink—where the averaged liquid loading will permit when needed to realize the visual effects implicit in image data.

Like the over- and underinking conditions that they are designed to correct, both depletion and propletion are essentially swath independent. That is, they transcend swath structures and are localized only with regard to the image itself.

(e) Printmode techniques—Another useful technique for concealing both banding and excess liquid deposition is laying down in one inking operation by the pen only a fraction of the total ink required in each section of the image. Any artifacts—areas that are either darkened or left unprinted in that inking—are visually diluted by one or more later inking installments.

Consider, for example, a dark strip. After printing of all the installments, although it remains darker than adjoining color fields, it is much closer to them—especially on a fractional or logarithmic basis—and therefore less conspicuous to the human logarithmic visual response. It typically is printed in only a fraction of the installments (in one installment out of, for example, three or eight), while the adjacent areas are printed with all the installments. Similarly an unprinted strip ordinarily lacks only the ink that should be printed in one installment, being filled in for all the others.

This technique is applicable equally to installments performed by firing a pagewide swath-height array and by scanning a small swath-height printhead across the printing medium. Each installment in a pagewide-array system may be called a "shot", and in a scanning system is usually called a "pass". For simplicity of expression here, the word pass is sometimes used to refer to both.

Thus operation with a single inking installment for each image region may be called a single-pass mode, and with more than one may be termed a plural-pass mode—or if more than two a multipass mode. The concept of plural-pass printmodes encompasses multipass operation.

The benefits of plural-pass printmodes are not limited to suppressing the conspicuousness of almost all artifacts, by the visual-dilution effect mentioned above. In addition plural-pass modes tend to control bleed, blocking and cockle by reducing the amount of liquid that is all on the page at any given time, and also may facilitate shortening of drying time.

The specific partial-inking pattern employed in each pass, and the way in which these different patterns add up to a single fully inked image, is known as a "printmode". Heretofore, as reported in several of the patent documents enumerated above—particularly those of Garcia and Gil—great advances have been made in the design and implementation of printmodes as such, and the data pipelines that implement them.

All those refinements are generally outside the scope of the present document. Some related innovations, however, will be discussed later in this document.

What is particularly important for present purposes is that printmasking cannot cure either problem—either overinking or banding—in its entirety. Excess-liquid problems reassert themselves as printing throughput increases. Banding, although its conspicuousness is very significantly depressed by multipass printmodes, nevertheless—by the nature of the above-discussed dilution mechanisms—does not disappear entirely.

The remaining band structure is often made extremely subtle, but yet visible and annoyingly persistent. This residual effect often stands out in particular image tonal ranges or colors, and becomes more and more important in a competitive market.

Furthermore multipass printmasking itself obstructs throughput increase, which is now highly prized in that same marketplace, and modern systems are trending back toward low-pass-number printmodes. Hence other solutions must be sought for banding problems.

(f) Other techniques A typical solution for reducing boundary artifacts has historically been to increase the number of passes. This is a trade-off rather than a solution, since printing times are seriously degraded.

Another approach consists of staggering or semistaggering the printheads. Since different printheads do not print their swaths on exactly the same line of pixels, coalescence is not as serious, and the boundary artifacts are much attenuated.

Semistaggering of printheads, though, produces hue-shift banding in bidirectional printing (that is, different portions of the swath show slightly different colors). Fully staggered printheads are not easy to support mechanically, because they require a very wide, flat paper path.

Still another approach, pursued actively in recent years, consists of diminishing the usage of end nozzles of the printhead. Ink is not deposited onto the media as a step function (sudden transition from dry to wet, along the paper-advance axis), but rather is applied as a smoothly growing function—also called a ramp, nozzle ramp, or nozzle tapering.

This technique is good for a relatively high number of passes (more than about four), but remains insufficient for fewer-pass printmodes (one to four passes). The reason is that the work not done by those end nozzles must be compensated by some backup nozzles, and the number of such backup units that are available is squeezed to the vanishing point as the number of passes is decreased.

The printmasking algorithm becomes more and more constrained with fewer passes and therefore fewer backup nozzles. In addition, steep ramps produce "big drop/little drop" effects (already-inked paper and dry paper display drops differently) that show up as hue-shift banding. So eventually, and for a low number of passes, the state of the art leads to trade-off decisions between boundary and hue-shift banding.

(g) Conclusion—Banding artifacts have continued to impede achievement of uniformly excellent inkjet printing at high throughput. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method for operating an ink-swath system to print an image. The method includes the step of identifying a portion of the image that has high color saturation along at least one swath boundary.

The method also includes the step of printing the image with ink depleted selectively in the identified portion. Here the words "high" and "selectively" are not intended to suggest that ink is diminished only in regions of highest inking. Rather they simply mean that—within at least some part of the colorant-intensity range—ink is diminished more where inking is higher.

Similarly, these terms also are not necessarily limited to diminishing of ink to an equal degree throughout a uniform region of high inking. To the contrary, a gradation or spatial hierarchy of ink diminishment is within the scope of the invention as defined by certain of the appended claims. Merely by way of example, in such a gradation more ink may be depleted along the very edge of a swath, and somewhat less may be depleted slightly farther inward from the edge.

Although the term "high" may sometimes in a sense be a relative term, in this context it is quite definite: it describes the fundamentally relative nature of preferred embodiments of the invention itself. That is, "high inking" is associated with "diminished selectively" to make clear that, in some part of the calorimetric dynamic range, the method selects higher-inking regions for greater ink diminishment; and lower-inking regions, for lesser diminishment.

The foregoing may represent a description or definition of the first aspect or facet of the invention in its broadest or most general form. Even as couched in these broad terms, however, it can be seen that this facet of the invention importantly advances the art.

In particular, by depleting selectively at high-saturation regions that happen to be along a swath boundary, this method incisively attacks the root problem in dealing with boundary artifacts heretofore—since those are precisely the regions subject to such artifacts. All the efforts discussed in a previous section of this document only addressed the boundary-banding problem indirectly.

Although the first major aspect of the invention thus significantly advances the art, nevertheless to optimize enjoyment of its benefits preferably the invention is practiced in conjunction with certain additional features or characteristics. In particular, if the system has a printmasking function preferably the identifying step includes locating the swath boundary through the printmasking function. (The word "printmasking" is discussed below in conjunction with the second main facet or aspect of the invention.)

In event that this basic preference is observed, then a subsidiary preference is that the locating include selecting swath positions identified in printmasks. In this case, then in turn it is preferable that the selecting include applying a printmask layer that has bits selectively positioned near the swath boundary.

If the basic preference as to use of the printmasking function is in use, then another subpreference is that the identifying step include determining high color saturation through application of a depletion-localizing mask layer. In this case, then in turn the determining includes operating the depletion-localizing mask layer as a highest-value mask layer. Use of this preference makes it still further preferable that the operating include applying the depletion-localizing mask layer subtractively.

Use of the depletion-localizing mask layer to determine high saturation, as mentioned above, also gives rise to a preference that the determining include applying the depletion-localizing mask layer only for pixels allocated maximum inking in at least one color plane. This preference in turn makes it preferable that the applying include using the depletion-localizing mask layer subtractively.

Another preference—when the subpreference for use of a depletion-localizing mask layer is in use—is that the locating comprises using that mask layer with bits selectively positioned near the swath boundary. Another basic preference, as to the first independent facet of the invention, is that the identifying step include selection of pixels having maximum inking in at least one color plane.

In preferred embodiments of a second of its aspects, the invention is a method for printing an image with a printer that has a printmasking function. The method includes the step of using the printmasking function to define depletion regions. This second facet of the invention also includes the step of printing the image with ink depleted selectively in the regions.

(The term "printmasking" usually relates to allocation of inkdrops as among inking passes or—more generally to encompass nonscanning printers—among inking installments. By this definition, a printer that always operates in a single-installment mode needs no printmasking. The great majority of printers that can operate in such a mode, however, are designed to operate in plural-installment modes as well, and therefore do have printmasking subsystems. This facet of the invention therefore can be used even in single-installment operation, if the printer itself has such a subsystem. Moreover even a printer that operates only in single-pass mode can be provided with a printmasking function—i.e., a subsystem having attributes of a printmasking system other than allocation among installments—and thereby enjoy the printmasking-related benefits of the invention.)

In a certain nonstandard sense it may be common to deplete inking along a swath boundary—but not selectively. That is, whenever a portion of a conventional mask layer (for example, a row along a swath boundary) has more zeroes than ones, in a sense it might be said that depletion is occurring there. On the average, however, the same is found elsewhere in the same mask layer; hence any such depletion is distributed broadly rather than selectively.

Any incidental concentration of mask-based depletion occurs without design, i.e. there is no scheme to concentrate printmask-based depletion at the boundary. Furthermore, statistically a counterbalancing positive increment in inking is found along the swath boundary in other mask layers.

The foregoing may represent a description or definition of the second aspect or facet of the invention in its broadest or most general form. Even as couched in these broad terms, however, it can be seen that this facet of the invention importantly advances the art.

In particular, this aspect of the invention implements a fundamental recognition that the printmasking function is a window into many mechanical functions of the printer. It enables linking directly to all problems that arise from those functions—and to curative strategies as well.

Such problems particularly include those related to boundary artifacts, but also other forms of artifact that have their origin in electromechanical components of the printer. In an inkjet printer, merely by way of example, such components may include inkjet nozzles, heaters, firing-signal electronics, scan-encoder subsystems, scanning mechanisms and control electronics, and printing-medium advance mechanisms and their control electronics.

Although the second major aspect of the invention thus significantly advances the art, nevertheless to optimize enjoyment of its benefits preferably this facet of the invention is practiced in conjunction with certain additional features or characteristics. In particular, preferably the using step includes establishing an auxiliary printmask to define the regions.

If this first basic preference is observed, then several other nested subpreferences arise. First, if the system forms the image in swaths of ink it is preferable that the using step include defining depletion regions near at least one swath boundary that is identified through the printmasking function.

Second, if such depletion regions are so defined, then it is also preferable that the defining include establishing the regions near the swath boundary by bits selectively positioned in at least one printmask. This in turn makes it preferable that the using step include defining depletion regions at pixels of high color saturation through application of a depletion-localizing mask layer.

If depletions regions at high-saturation pixels are defined by application of such a later, then it is still further preferable that this application include operating the depletion-localizing mask layer as a highest-value mask layer. This operating, moreover, preferably applying the depletion-localizing mask layer subtractively.

The subtractive application of a depletion-localizing mask layer is also strongly preferred more generally. For example such subtractive application is preferred relative to the basic printmasking function, and again in event of the auxiliary-mask establishment, and so forth.

Another basic preference is that the method further include the step of measuring test-plot optical-density nonuniformity arising from any or all of these types of defects or artifacts or others that produce nonuniformity:

boundary artifacts,
swath-height error,
printing-medium advance error,
bidirectional banding,
minibanding, and
area-fill nonuniformity;

and that the using step include defining, through the printmasking function, depletion regions and magnitudes that compensate for the measured nonuniformity.

In this case a subpreference is that the using step tend to correct all the defects or artifacts for each color plane independently. This particular capability is an extremely powerful result, for prior methodologies and systems were stringently limited to solving these problems by compromise print-medium-advance settings and the like.

Those compromises were required because the artifacts arose independently in the different colorant printheads or so-called "pens". Therefore the compromise settings could do no more than strike a best balance of artifact mitigation among the several color planes, and this best balance was in many or most instances still far from a complete cure for at least one or two of the heads.

Another subpreference arises from the fact that in this second facet of the invention, all the correction is initially taken in the form of depletion—which systematically depresses the overall level of inking. Therefore it is preferable that the method further include the step of raising an ink-limit value to compensate for overall underinking effects of the defining.

In preferred embodiments of a third of its basic aspects or facets, the invention is a method for printing an image with a printer that has a printmasking function. This method includes the step of measuring test-plot optical-density nonuniformity.

It also includes the step of using the printmasking function to define ink-adjustment regions and magnitudes to compensate for the measured nonuniformity. Yet another step is printing the image with ink adjusted selectively in the regions and according to the magnitudes.

The foregoing may represent a description or definition of the third aspect or facet of the invention in its broadest or most general form. Even as couched in these broad terms, however, it can be seen that this facet of the invention importantly advances the art.

In particular, this aspect of the invention bridges the gap between observed artifacts or anomalies and the precise corrective localizations enabled by other facets of this invention. In essence this facet of the invention takes the form of negative feedback between quantitative measurement of nonuniformity and its compensation—but on a photographically localized basis.

Furthermore, as couched here this aspect of the invention is not limited to a two-stage cure, i.e. subtractive corrections followed by raising an ink limit. It may instead make some subtractive and some additive corrections, as prescribed by the measurements, all in one direct step.

Although the third major aspect of the invention thus significantly advances the art, nevertheless to optimize enjoyment of its benefits preferably the invention is practiced in conjunction with certain additional features or characteristics. In particular, preferably the measuring step responds to nonuniformity arising from any or all of the types of defects or artifacts enumerated above and, again, others that introduce nonuniformity.

Another preference, as in the case of the second facet, is that the using step tend to correct all the defects or artifacts for each color plane independently. This feature alone represents a major step forward.

In preferred embodiments of a fourth of its aspects, the invention is apparatus for printing an image in inkdrops, subject to mechanical artifacts. The apparatus includes some means for establishing units of ink depletion, prelocalized with respect to such artifacts and manipulated as negative inkdrops.

For purposes of generality and breadth in discussing the invention these means will be called simply the "establishing means". In this document the phrase "mechanical artifacts" means artifacts in an image that are caused primarily, if not only, by imperfections in the mechanical features of the mechanism as such—rather than primarily or only by excessive inking requirements arising in the image.

Further, the term "prelocalized" means that potential locations of these depletion units, and the magnitudes of their effects, can be measured before knowing much about the image. (The locations of the depletion units are very loosely described here as "potential" because the depletion units may not actually be applied, in event the image color saturations are low in those locations.)

It will be understood that there is no such thing, speaking physically or literally, as a "negative inkdrop"; the foregoing discussion refers instead to a methodology for manipulating units of ink depletion almost as if they were negative drops. As will be seen in following sections of this document, this methodology simply entails a kind of drop and depletion-unit bookkeeping, or accounting, in which depletion units are offset against inkdrops.

The apparatus also includes a print engine. The engine prints the image with the drops and depletion units.

The foregoing may represent a description or definition of the fourth aspect or facet of the invention in its broadest or most general form. Even as couched in these broad terms, however, it can be seen that this facet of the invention importantly advances the art.

In particular, the "negative inkdrop" paradigm focuses the correction of boundary artifacts precisely at the points—and in the amounts—required. It is an ideal implementation of the potential for cure at the locations so specifically identified through the masking function.

Although the fourth major aspect of the invention thus significantly advances the art, nevertheless to optimize enjoyment of its benefits preferably the invention is practiced in conjunction with certain additional features or characteristics. In particular, when the apparatus is used for printing the image in plural successive inking installments it preferably further includes:

some means for allocating each inkdrop to one of the installments, respectively; and
some means for allocating at least some of the units of ink depletion to one of the installments, respectively.

The engine then prints the image with the drops and units as allocated to the installments.

(Here the term "respectively" is not intended to suggest that there must be a separate inking installment for each drop; the point is merely that not all the drops or depletion units are allocated to the same one of the installments. An analogous understanding of the word "respectively" is also intended as to the fifth major facet of the invention discussed below, particularly for the second "alternative preference" introduced in that discussion.)

When this preference is observed, then a nested group of preferences comes into play. First, preferably the depletion-allocating means include bits selectively positioned in at least one printmask to define a depletion region with respect to a swath of inkdrops.

If this is the case, then preferably the printmask includes at least one depletion-localizing mask layer, containing the bits, that is invoked only at pixels of high color saturation. In this event, further the depletion-localizing mask layer is a highest-value mask layer.

Another basic preference, as to this apparatus aspect of the invention, is that the depletion units include at least one depletion-localizing mask layer that is invoked only at pixels of high color saturation.

Two alternative basic preferences are that the print engine include—for each colorant that is in use—either a scanning array of inking units, or a pagewide array of inking units. The pagewide array has multiple inking rows for inking a pagewide swath.

Either type of engine also includes a firing system for providing signals to operate the array. Also preferably included are some means for shifting such printing medium along a medium-advance axis between successive inking installments, or successive groups of inking installments, of the array.

All of the foregoing operational principles and advantages of the present invention will be more fully appreciated upon consideration of the following detailed description, with reference to the appended drawings, of which:

BRIEF DESCRIPTION OF THE DRAWINGS

FIG. 6 is a bottom plan of a pagewide swath-height array for use instead of one or more of the FIG. 5 scanning heads; and FIG. 7 is a top plan of a representative sheet of printing medium with two swaths already printed by the FIG. 6 array, and with the array in position to print another swath.

DETAILED DESCRIPTION OF THE PREFERRED EMBODIMENTS

Figure 1:
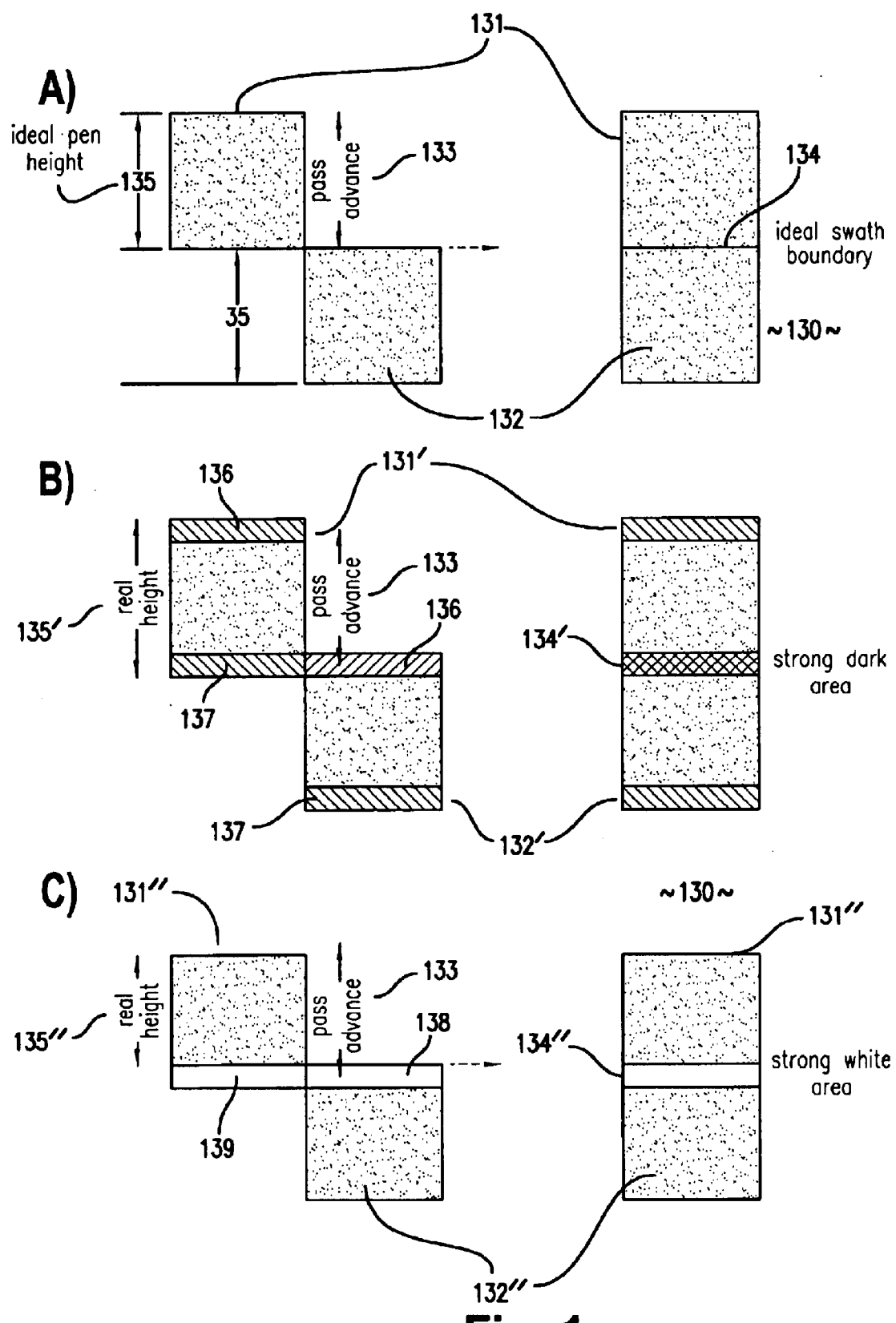
FIG. 1 is a diagram of three views illustrating nominal and nonnominal swath heights relative to nominal print-medium advance stroke, with corresponding interfit patterns between successive swaths: in view A), the swath height is nominal, in view B) it is too long, and in view C) it is too short.

1. White-Drop Masking (a) Constraints on conventional systems—Preferred embodiments of the present invention aim at the root cause of the boundary artifacts problem: concentration of ink coalescence at swath boundaries. If a full-color rectangle is printed, visibly the ink dries in the center earlier than at the edges.

The beginning of a solution is to direct less ink to the edges—that is, when printing a given swath, to deposit less ink at the swath boundary, by a lesser use of the end nozzles of the printhead. It can then be decided whether to make up for that ink not fired.

Initially, the answer is yes: the end result should always be a so-called "full mask". This means that, after all the passes, all the pixels on the printing grid have been addressed the same number of times—typically once, but more times if two or more drops per pixel are defined.

In other words, the light work of any given nozzle is compensated by other nozzles that also print on the same row but in a different pass. A full mask is extremely desirable for light tones.

A few drops may be omitted when printing a fully-saturated area, and in fact this is successfully implemented in the earlier-discussed depletion procedure—associated with the halftoning procedure. A white-banding line, however, appears if the same is attempted on a light-colored area.

Since there seems to be a need for depletion only in saturated areas, it might be supposed that the halftoning algorithm could decide where to apply this depletion. For better or for worse, however, halftoning algorithms are totally ignorant of the printmode parameters, not to mention where the swath boundary will occur.

Thus there is a need for a certain depletion, but localized at swath boundaries and only for saturated-color areas. The sought-for algorithm must take into account both halftoning and printmode information, so that printing masks are conveniently depleted at the swath boundary but only if a significant amount of ink is present.

This would suggest designing printmasks that are halftone-dependent, but conventional writing-systems architecture ordinarily allows only masks that tile over the whole plot. It is difficult to think of all the implications of plot-dependent masking, in terms of memory, CPU power and engineering.

(b) Multilayer masking and spare levels—Currently conventional printmasking, however, does offer a narrow escape. To enable appreciation of that solution, first this subsection describes some operational parts of the so-called "Shakes" printmasking system.

That system is introduced and detailed in the previously mentioned Garcia documents. The Shakes system is now routinely incorporated into incremental-printing data pipelines.

Multilevel masks are, in a certain sense, plot-dependent—because a different number of mask layers is selected automatically, depending on the multibit value of each pixel. The color value in each pixel discriminates between adjacent levels in the printmasking structure.

To put it another way, the color value in each pixel discriminates among all the available combinations of masks. The color value itself thereby invokes an appropriate combination of masks to produce the necessary number of inkdrops for that pixel.

In the Shakes system, this is the situation just before printing:

Binary masks A, B, C (not shown) have been generated from multilayer Shakes masks (see sample tables below). For instance, if the drop table reads "[0 1 2 4]", then mask A will specify the first drop, mask B the second one, and mask C the third and the fourth drops, as follows.

If the two-bit code of a pixel is "00", no mask is called up as the system should not print any drop.

If the pixel code is "01", the system prints whatever mask A specifies.

If the code is "10", the system prints whatever is specified in mask A and whatever is specified in mask B (i.e., a Boolean "or" function, mask A+mask B).

If "11", the system prints whatever is specified in mask A plus (Boolean "or") whatever is specified in B, plus ("or" again) whatever is specified in C (i.e., again in Boolean notation mask A+mask B+mask C).

In short, masks A, B and C are additive. Each mask represents a number of drops to be fired—and the system selects the appropriate number of masks, based upon the image contents.

Masks A, B and C are full masks. That is, if all the pixels in a plot and data pipeline were "11", the same number of drops would be fired onto all the pixels.

The Shakes drop-table contents and their implications stated above are only an example. The implication of the drop table specified, [0 1 2 4], can be summarized:

|        |         |
| ------ | ------- |
| level 00 | 0 drop |
| level 01 | 1 drop |
| level 10 | 2 drop |
| level 11 | 4 drops. |

Ordinarily, however, the maximum number of drops used is two—particularly for printmodes of about three or fewer passes or installments.

Therefore the last level "11" may be treated as a spare level, available for special use. Exactly such a diversion of level "11", for purposes of the present document, is described in subsection (c) below.

Other uses of the Shakes notation heretofore, also by way of example, include drop table [0 1 1 2], meaning:

|        |         |
| ------ | ------- |
| level 00 | 0 drop |
| level 01 | 1 drop |
| level 10 | 1 drop |
| level 11 | 2 drops. |

A typical multilayer Shakes mask set for this pipeline would be (for an eight-nozzle pen and four-pass printmode):
for the first drop—

```
4 1 4 2 3 4 1 4 1 3 1 2 1 3 1 3
3 4 1 4 1 2 4 2 4 1 3 1 2 1 4 2
1 2 3 1 2 4 2 4 2 3 4 3 1 4 3 4
3 1 4 2 3 1 3 2 1 2 1 4 2 1 2 1
4 2 1 3 1 3 2 4 3 4 3 2 4 2 1 2
1 4 2 1 4 1 3 2 4 1 2 1 2 4 2 4
4 2 1 4 3 4 1 4 2 3 4 2 1 2 4 1
3 4 3 1 2 1 2 1 3 2 1 4 3 1 2 4
``` for the second drop—

```
1 2 1 4 2 1 4 1 4 1 4 3 4 1 4 2
2 1 4 3 4 3 1 4 2 4 2 4 1 2 1 4
4 3 2 4 3 2 3 1 4 2 1 2 4 1 2 1
1 2 1 3 2 4 1 3 2 3 2 1 3 4 3 2
2 3 4 2 4 2 4 1 4 1 4 3 1 3 4 3
4 1 3 4 1 4 2 4 1 4 3 2 4 1 3 1
1 4 2 1 2 1 4 2 3 2 1 4 2 4 1 4
2 3 1 4 3 2 3 4 2 3 4 1 4 3 4 1
```

This means that, in the bottom-right pixel, the first drop is to be fired in pass 4; and the second drop, pass 1. In other words, if the pixel value is 11, a drop will be discharged during passes 1 and 4. If the pixel value is 01 or 10, a drop is directed to this pixel location in pass 4 only.

With this assignment of values, actually somewhat preferred in some regards, levels "01" and "10" yield identical operation. Hence either one of them may be eliminated as an unused, spare level—once again making room for assignment of one level to a special purpose.

As a practical matter it will be understood that an eight-nozzle pen is a thing of the past, and modern-day pens—and therefore masks—typically have several hundred or even more than a thousand nozzles. Moreover, masks are typically some hundreds of pixels wide. The principles under consideration, however, are independent of absolute mask or pen size, and their discussion in terms of an eight-nozzle pen is therefore entirely valid.

(c) Multilayer printmasking as a depletion discriminator, with subtractive masking—Preferred embodiments of the present invention introduce a new use of such a spare level. In general it is preferable to rearrange the drop-table contents if necessary so that the spare is the highest-value level—as it is in the first above example, [0 1 2 4]. For instance rearrangement is necessary if the starting configuration is considered to be the second above example, [0 1 1 2].

As will shortly become more clear, such rearrangement is desired because the previously spare level is then invoked only in cases of maximum inking in the particular color plane. The pixel color value itself then automatically calls the desired special behavior as suggested in subsection (b) above. For purposes of preferred embodiments of the present invention, that special behavior is to link the high level to a mechanism for mitigating boundary artifacts or other kinds of image artifact.

The pixel color-value structure thus operates as a discriminator, determining in turn when more and still more ink is required—and then, finally, when the amount previously invoked may be too much. At least the discriminator responds when that amount may be too much for certain specific positions in the swath.

Thus the spare level is advantageously made to correspond to a new, artifact-reducing use for, in particular, mask C. This mask has several extraordinary attributes.

First, mask C does not add, but subtracts. Further, it is not a full mask—it shows only which drops called by mask A or B must be disregarded (in a sense erased) for a certain value of the print.

In this formulation mask C is called a "white-drop mask". For comparison with the foregoing now-conventional Shakes procedure with drop table [0 1 2 4], the system now operates thus:

Binary masks A and B have been generated out of multilayer Shakes masks as before; and mask C, out of a novel Shakes white-drop mask generator. For instance if the drop table reads "[0 1 2 x]", then mask A will specify the first drop, mask B the second one, and mask C the "white" or subtractive virtual drops. As to real drops, in effect the last value of the drop table has been declared negligible.

If the two-bit code of a pixel is "00", as before the system calls no mask and prints no drop.

If "01", as before the system prints whatever mask A specifies.

If "10", as before the system prints whatever is specified in A plus whatever is specified in B (Boolean mask A+mask B).

If "11", the system prints whatever is specified in mask A plus (Boolean "or") whatever is specified in B unless (Boolean "and not") mask C tells us otherwise: (mask A "or" mask B) "and not" (mask C)=mask A+mask B−mask C.

By default, mask C will have a value of zero, except in some pixels close to the swath boundary. Bits are positioned along the swath boundary in those mask-C pixels known to be susceptible to boundary artifacts.

Then, by design, mask C affects only swath boundary areas with high density of ink, without affecting low-density ones—in other words, just the desired areas needing correction.

This white-drop masking protocol can be conceptualized as providing a pen with white ink. The white ink is applied when too much real ink would otherwise appear on conflictive areas—in this case, specifically, boundary areas.

There seems to be a disadvantage, namely that the conventional function for the last level of the drop table has been lost. On the other hand, the system typically can fire only as many drops per pixel as number of passes.

This preferred embodiment is of interest largely for a printmode with a relatively small number of passes. As such modes rarely fire more than two drops, the disadvantage seldom comes into play.

(d) Graduated white-drop correction—If preferred, white-drop masking can be provided in plural masks. Swath boundary regions may be defined for each pass differently than in other passes.

When each pass has its own respective boundary-banding depletion mask, intensity of depletion can be varied with precise position near the swath edge. It is not necessary to be limited in depletion quantity to all drops or none—or to one drop or none. A depletion hierarchy is readily established that echoes the known positionally varying intensity of the banding itself.

Boundary artifacts themselves, as well as each other type of artifact addressed in this document, are not simple binary. Rather, each type appears in continuous gradations arising from the variable degree of coalescence or other underlying cause.

Thus a plural-bit pipeline is preferred to define a white-drop mask. Normally, just as in the real-inkdrop regime, two bits are used per pixel, providing three nonzero levels: 01, 10 and 11.

Figure 2:
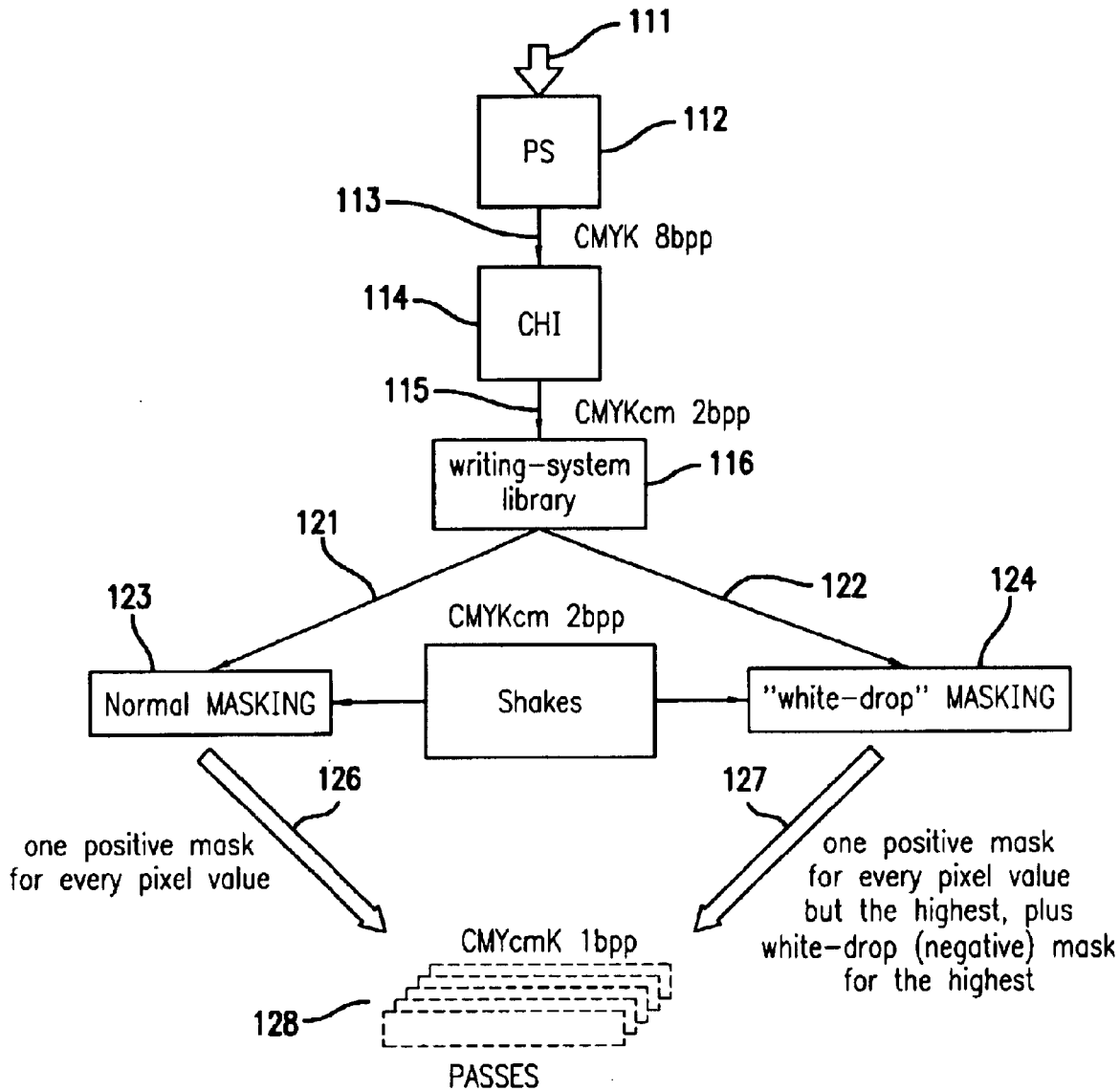
FIG. 2 is a flow chart showing incorporation of preferred embodiments of the invention into a Shakes masking system, e.g. such as disclosed in the earlier-mentioned Garcia patent documents.

(e) Leveraging preexisting systems—Preferred embodiments of the invention are incorporated into the masking pipeline in such a way as to minimize need for hardware modification. Input data 111 (FIG. 2) are directed to a conventional postscript rendition stage 112, in which color signals defined in e.g. a graphics language are used to generate corresponding color data 113 for use in printing. These data are most typically eight bits per pixel for each of four primary colorants cyan C, magenta M, yellow Y and black K—for a total of thirty-two bits per pixel.

Also conventional is a Contone-to-halftone interface ("CHI") 114, whose operations include splitting the signal for relatively dark chromatic colorants C and M to allow more sensitive control of fine gradations, particularly in image highlight regions. This splitting process yields data 115 that include light cyan and magenta c, m—now at two bits per pixel for each of the total six colorants, i.e. twelve bits overall. The CHI also halftones all of the six resulting color planes.

The halftoned data next proceed to a writing-system library 116, which selects and invokes configuration files and other data—as well as algorithms—for an appropriate printmasking regime. For instance data 121 from the library may proceed to conventional masking 123, driven by the Shakes master system 125, which ordinarily provides a positive simple-binary mask 126 for each input pixel value—and for each colorant (i.e. each respective nozzle array) in the system.

Alternatively data 122 from the library may proceed to white-drop masking 124 in accordance with preferred embodiments of the present invention, likewise driven by the Shakes system 125. In this case the masking 127 produced includes a positive simple-binary mask for each input pixel value except the highest; plus a white-drop (negative) mask for the highest value.

White-drop masks are autoselected in this way for each of the six colorants independently; however, in some embodiments the light colors are not depleted at all. They are used primarily to avoid granularity in highlight regions, where neither high inking nor the artifacts of interest are usually problematic.

In the final output stage 128 the masks are applied to the image data to generate firing-control signals for individual nozzles in individual printing passes. It is at this point that the subtractive character of the white-drop mask comes into operation, deducting one or more bits from one of the lower-value masks whenever the highest pixel value appears.

It can now be seen that the data flow for white-drop processing is substantially identical to that for conventional operation, with the sole exception of the character of the masking structure 127 provided from the masking process 124 to the final output stage 128. Thus a major advantage of preferred embodiments of the invention is that departures from the conventional scheme are largely limited to changes in drop tables, configuration files and masks—in other words, in very easily accessible data formats rather than hardware and executable firmware.

Preferred embodiments of this boundary-banding form of the invention are applicable in both a scanning printer and a pagewide swath-height array. The problem of ink coalescence at boundaries is roughly the same in both these systems; however, adaptive artifact-correction forms of the invention (discussed below) may be somewhat less powerful in relation to pagewide swath arrays and the like, because here each nozzle produces only an individual pixel, not a row.

(f) Mask details—As explained above, it is common for a Shakes system to have one spare level, or in any event a level that can be declared to be a spare and thereby diverted to purposes of preferred embodiments of the present invention.

Some preferred white-drop embodiments map that spare color-value level to a corresponding third level of masking, which is zero by default. Bits in certain positions of that level, however, are set to nonzero values—and these in turn are declared to correspond to so-called "negative drops".

Physically and literally speaking an inkdrop cannot be negative. Real inkdrops have physical substance, which is positive only.

Hence as earlier suggested the concept of negative or virtual drops is no more than an intellectual construct; it facilitates the manipulation of artifact correction or mitigation, according to preferred embodiments of the invention. In particular, a mask layer can be defined arbitrarily for negative drops as well as for positive, and such a layer can then be added as a correction or revision to a real, positive drop layer. For instance:

white-drop mask—

```
1 0 0 0 0 1 0 0 0 0 1 0 1 1 0 0
2 0 0 0 0 2 0 0 0 0 2 0 2 0 0 2
0 0 2 0 2 0 0 0 0 2 0 2 0 0 0 0
3 0 0 3 0 0 3 0 0 0 0 0 3 0 3 0
0 0 0 0 3 0 0 3 0 0 3 0 0 0 0 3
0 4 0 4 0 0 0 4 0 0 0 0 0 4 0 0
0 4 0 0 0 0 4 0 0 0 4 0 0 4 4 0
0 0 1 0 0 1 0 0 0 0 1 0 0 0 0 1
```

As this mask is considered to contain negative drops, it can be called a "depletion mask"—but it is separate from the main mask (first-drop and second-drop masks). Furthermore it is also separate from conventional depletion masks in that, as will now be explained, it affects the swath boundary only.

As with the examples taken up in subsection (b), this example presupposes an eight-nozzle printhead, printing four passes. The table is a so-called "shingle mask", which by Shakes convention maps directly to a swath for the first pass—or, to encompass the case of a pagewide swath-height array, the first inking installment.

For other installments, mask rotation or autorotation brings different mask rows in turn to the swath boundaries so that each swath receives boundary depletion. For pass 2 the swath boundaries are between the second and third rows of the mask; for pass 3, between the fourth and fifth rows; and for pass 4, the sixth and seventh. Such masking is implemented through the conventional Shakes process of generating from this shingle mask a corresponding number of binary masks for application to the individual passes respectively.

The shingle mask has entries "1" along the top and bottom rows, indicating that some negative drops are to be applied in pass 1, along those two boundaries. Thus pass 1 is depleted only in the first and last lines of the mask, which correspond—considered together—to the top and bottom swath boundary for that pass; and similarly for the rest of the passes.

Even in those lines, the intention is not to deplete the entirety of the inking—but rather only the excess, above nearby area-fill equivalent background, that is generated by coalescence. Hence the "1" entries do not appear in every pixel along either boundary, only in spaced pixels that add up to—in this particular example some 25% to 31% of uniformly applied single-drop inking.

Preferably pass numbers in this mask are spaced irregularly along their rows. Regular spacing could itself generate repetitive patterns that would introduce moiré or other artifacts.

For the sake of simplicity this reduced-size example excludes negative drops along the left and right end boundaries. In actual practice white-drop bits are included there, especially if pagewide masks are in use facilitating such placement, for printers that are particularly susceptible to coalescence at the swath ends—as boundary artifacts can be quite conspicuous along the left and right edges of the overall image. Even for narrower masks, special left- and right-edge masks can be invoked if the susceptibility to coalescence is severe.

For more-intense depletion requirements, plural-bit white drops are also possible as mentioned above. In addition the contour of the depletion region is not limited to rows or columns exactly along the edge, but instead can be made to extend two or more drops inward from the edge of each swath. In the latter case, the average spacing can be made progressively more sparse for pixels progressively farther from the edge, to mirror the tendency of coalescence to tail off progressively for regions of lower surface tension.

Looking at the bottom-right pixel in the foregoing tables (i.e., including the two in subsection [b]), the system behavior is now—depending on the pixel value, and recalling that the third mask works subtractively:

| pixel value | action |
|---|---|
| 00 | don't print |
| 01 | print first mask (i.e. place drop on pass 4) |
| 10 | print first and second masks (drops on pass 1, 4) |
| 11 | print first to third masks (drop on pass 4 only). |

As to the last line, pass 1 has one drop before application (i.e., subtraction) of the white drop specified by level 11, and zero drop after.

It could be proposed to just map level 11 to the first mask only, in hopes of achieving the same result but this approach would not be valid. The result is different, as the system is both position- and value-dependent. The difference can be seen by shifting focus one pixel to the left (still on the last row on the mask):

| pixel value | action |
|---|---|
| 00 | don't print |
| 01 | print first mask (i.e. place drop on pass 2) |
| 10 | print first and second masks (drops on pass 2, 4) |
| 11 | print first to third masks (drops on pass 2, 4). |

In this version, the third mask does not subtract any drop. This example demonstrates that pixel subtraction governed by the white-drop mask is:

position-dependent for a given value: value 11 causes one drop to be printed on the bottom-right pixel, but two for its left-hand neighbor; and value-dependent for a given position: a certain col- or may be halftoned to value 10, and get two drops on that position, or to value 11, and get only one drop on the same position.

Nonzero numbers in the white-drop mask correspond to the same numbers that exist in either of the two real-drop masks, not necessarily the first and not necessarily the second. For instance, when value 11 must be printed in a depletion-marked location, one drop will be fired there instead of two—but the subtracted drop is not necessarily what is called "the second drop"; it is simply that one drop is fired instead of two.

(g) Mask generation—Preferred embodiments of the white-drop masking procedure are part of a program called "ShakeSmall", a simplified version of Shakes developed to run in the Hewlett Packard DesignJet 5500 printer. The following explanation is simplified, in that it bypasses other printmasking features (nozzle-out error hiding, and printmask ramping) which are taken up in other patent documents including some of those listed earlier.

The preferred procedure has four general steps, of which the first two are part of Shakes and ShakeSmall:

use rules to generate the real, positive-drop masks, retain those masks, define the rules for the white-drop mask, and run algorithm with those masks and rules as input.

The output for each color plane is a new mask, whose last level corresponds to the negative drops. These steps will be taken up in turn in the corresponding four subsections (h) through (k) below.

(h) Generate real-drop masks—The above-depicted masks have been created with the following script, due to Joan-Manel Garcia.

```
matrix firstMat    # This defines the object firstMat, of
                   # type matrix. From now on, other objects
                   # can refer to it. This is a weighter,
                   # and defines design constraints.
    {0 1 0}
    {1 x 1}
endmatrix
greedyMask mk1
    define {
        size (16, 8) # size (width, height)
        passes 4
    } with {
        firstMat 1.0       # Use firstMat as a weighter,
                           # with severity 1.0
    }
    random 0.9
end GreedyMask
constraint intermask
    default 1.0
        (0,0) [0:0.0]
endconstraint
greedyMask mk2
    define {
        size (16, 8)      # size (width, height)
        passes 4
    } with {
        firstMat 1.0      # Use firstMat as a weighter,
                          # with severity 1.0
        intermask 1.0 to mk1
    }
    random 0.1
end GreedyMask
multiMask mk
    addLayer mk1
    addLayer mk2
endMultiMask
output mk to mask-4ps-2d.scm
```

(i) Retain masks—The result of running Shakes on the above script yields the "positive" masks:

```
S1
# width height
16 8
# passes dpp
4
2
# data
4 1 4 2 3 4 1 4 1 3 1 2 1 3 1 3
3 4 1 4 1 2 4 2 4 1 3 1 2 1 4 2
1 2 3 1 2 4 2 4 2 3 4 3 1 4 3 4
3 1 4 2 3 1 3 2 1 2 1 4 2 1 2 1
```

-continued

```
4 2 1 3 1 3 2 4 3 4 3 2 4 2 1 2
1 4 2 1 4 1 3 2 4 1 2 1 2 4 2 4
4 2 1 4 3 4 1 4 2 3 4 2 1 2 4 1
3 4 3 1 2 1 2 1 3 2 1 4 3 1 2 4

1 2 1 4 2 1 4 1 4 1 4 3 4 1 4 2
2 1 4 3 4 3 1 4 2 4 2 4 1 2 1 4
4 3 2 4 3 2 3 1 4 2 1 2 4 1 2 1
1 2 1 3 2 4 1 3 2 3 2 1 3 4 3 2
2 3 4 2 4 2 4 1 4 1 4 3 1 3 4 3
4 1 3 4 1 4 2 4 1 4 3 2 4 1 3 1
1 4 2 1 2 1 4 2 3 2 1 4 2 4 1 4
2 3 1 4 3 2 3 4 2 3 4 1 4 3 4 1
```

(j) Generate white-drop mask rules—For this example the first and last nozzle of the swath will be depleted by fifty percent. This fifty percent means that, for each possible position to deplete, deciding whether to actually deplete in a particular inking installment is statistically equivalent to the toss of a coin.

As before, for this example the printhead has eight nozzles:

```
whiteRamp
    nozzle: 1 value: 500 gamma: 1000
    nozzle: 2 value: 0 gamma: 1000
    nozzle: 7 value: 0 gamma: 1000
    nozzle: 8 value: 500 gamma: 1000
endWhiteRamp
```

The above syntax defines a depletion curve as a function of the nozzle number. Rather than defining the function for each nozzle, the protocol can define it by intervals.

In the above example, values in the interval from nozzle 2 through nozzle 7 are to be interpolated. The parameter "gamma" sets the interpolation rules, but individually-defined values (as for nozzles 1 and 8) override gamma.

For this example the interval defined is flat; hence all nozzles from 2 to 7 will have a value of 0 (i.e., they are not to be depleted). The maximum allowed value is set to 1000, and to obtain the desired fifty-percent depletion of nozzles 1 and 8 the value for those two nozzles is set to 500 (500/1000=0.5).

Application of the desired fractional depletion is only statistical. Therefore rather wide masks are needed to achieve actual depletion very close to the desired value, i.e. here fifty percent.

This "actual depletion" is, for the finished masks, the ratio between the number of times a pass number appears in a row, in mask 3, and the total number of times that same pass number appears in the same row in masks 1 and 2 together. In this example, for moderate mask sizes actual depletion values will be found in the range between forty and sixty percent.

(k) Define and run new algorithm—This algorithm takes as inputs the positive masks of subsection (i) and the "whiteRamp"-script rules of subsection (j). The output is a new mask, whose last level corresponds to the "negative" drops:

```
S4
# width height
16 8
# passes dpp wdmask
4
```

```
2 1
# data
4 1 4 2 3 4 1 4 1 3 1 2 1 3 1 3
3 4 1 4 1 2 4 2 4 1 3 1 2 1 4 2
1 2 3 1 2 4 2 4 2 3 4 3 1 4 3 4
3 1 4 2 3 1 3 2 1 2 1 4 2 1 2 1
4 2 1 3 1 3 2 4 3 4 3 2 4 2 1 2
1 4 2 1 4 1 3 2 4 1 2 1 2 4 2 4
4 2 1 4 3 4 1 4 2 3 4 2 1 2 4 1
3 4 3 1 2 1 2 1 3 2 1 4 3 1 2 4

1 2 1 4 2 1 4 1 4 1 4 3 4 1 4 2
2 1 4 3 4 3 1 4 2 4 2 4 1 2 1 4
4 3 2 4 3 2 3 1 4 2 1 2 4 1 2 1
1 2 1 3 2 4 1 3 2 3 2 1 3 4 3 2
2 3 4 2 4 2 4 1 4 1 4 3 1 3 4 3
4 1 3 4 1 4 2 4 1 4 3 2 4 1 3 1
1 4 2 1 2 1 4 2 3 2 1 4 2 4 1 4
2 3 1 4 3 2 3 4 2 3 4 1 4 3 4 1

1 0 0 0 0 1 0 0 0 0 1 0 1 1 0 0
2 0 0 0 0 2 0 0 0 0 2 0 2 0 0 2
0 0 2 0 2 0 0 0 0 2 0 2 0 0 0 0
3 0 0 3 0 0 3 0 0 0 0 0 3 0 3 0
0 0 0 0 0 3 0 0 3 0 0 3 0 0 0 3
0 4 0 4 0 0 0 4 0 0 0 0 0 4 0 0
0 4 0 0 0 0 4 0 0 0 4 0 0 4 4 0
0 0 1 0 0 1 0 0 0 0 1 0 0 0 0 1
```

So the system begins by feeding the file in subsection (h) into a module called "Automatic Mask-Generation algorithm" (which is the Shakes program), to output the filing in subsection (i)—the mask. Then subsections (i) and (j), the white-drop definition, feed into a new module, "White-Drop Mask Automatic Generation", and the output is shown in this subsection (k).

The latter enters another new module, "Format Conversion", that generates a binary pattern for the lower-level masking algorithms. This binary pattern is finally combined, in the usual manner of printmasking, with the two-bit rasterized image—and printed.

Typically, the files in (h) and (j) are kept in a hard disc drive inside the printer, but any other kind of nonvolatile memory can be used. Alternatively they can be fed by the printer driver, attaching them to the header of the file that is to be printed.

(l) Activation of white-drop masks—In the configuration file for the master Shakes or ShakeSmall program in the printer, a flag is to be set. It may be called e.g. "whiteDrop 1".

If printmasks in use are less than full image width, the left and right image edges usually are not treated for boundary banding as such. Special masking for those positions can be provided, but ordinarily this is not cost effective.

For the top and bottom edges of each swath, within ShakeSmall white-drop masking can be established in the form of an end-of-nozzle ramp function. A function is defined for each printhead in turn, the sequence being CMYKcm:

```
whiteRamp
    nozzle: 1 value: 0 gamma: 1000
    nozzle: 502 value: 0 gamma: 1000
    nozzle: 503 value: 500 gamma: 1000
    nozzle: 504 value: 0 gamma: 1000
endWhiteRamp
whiteRamp
    nozzle: 1 value: 0 gamma: 1000
    nozzle: 502 value: 0 gamma: 1000
    nozzle: 503 value: 500 gamma: 1000
    nozzle: 504 value: 0 gamma: 1000
endWhiteRamp
whiteRamp
    nozzle: 1 value: 0 gamma: 1000
    nozzle: 502 value: 0 gamma: 1000
    nozzle: 503 value: 1000 gamma: 1000
    nozzle: 504 value: 0 gamma: 1000
endWhiteRamp
whiteRamp
    nozzle: 1 value: 500 gamma: 1000
    nozzle: 2 value: 0 gamma: 1000
    nozzle: 335 value: 0 gamma: 1000
    nozzle: 336 value: 200 gamma: 1000
    nozzle: 337 value: 0 gamma: 1000
    nozzle: 503 value: 0 gamma: 1000
    nozzle: 504 value: 1000 gamma: 1000
endWhiteRamp
whiteRamp
    nozzle: 1 value: 0 gamma: 1000
    nozzle: 502 value: 0 gamma: 1000
    nozzle: 503 value: 500 gamma: 1000
    nozzle: 504 value: 0 gamma: 1000
endWhiteRamp
whiteRamp
    nozzle: 1 value: 0 gamma: 1000
    nozzle: 502 value: 0 gamma: 1000
    nozzle: 503 value: 500 gamma: 1000
    nozzle: 504 value: 0 gamma: 1000
endWhiteRamp
```

These values apply for a particular combination of printing medium, ink and printmode—and vary with each of these parameters.

One preferred arrangement is a three-pass mode, printing with only 504 nozzles of a total 600. Typically the next-to-last nozzle is depleted, so that the ink in the last row can expand a bit more uniformly to the top (where the depleted row is) and to the bottom (which is dry).

That next-to-last row is usually half-depleted for the C, M, c, and m pens, and fully depleted for Y. A more-complex rule is adopted for the K head: half and full depletion for the top and bottom respectively. Also depleted is one of the intermediate rows that happens to fall onto the swath boundary of the previous pass: for total nozzle complement of 504 and printing-medium advance of 168 rows, it is nozzle 504−168=336.

In most-effective practice of the invention, all the settings are advantageously found on a trial-and-error basis for each particular environment and combination of medium, ink and printmode. Accordingly no definite explanation or firm theory can be stated in terms of ink-to-media behavior.

2. Adaptive Artifact Compensation (a) White-drop methods for other artifacts—White-drop masking, though initially developed to combat boundary artifacts, has been found to be extremely powerful beyond the removal of those particular artifacts. The overall objective is not only to increase print quality in fast, low-pass-number printmodes by reducing boundary artifacts but also to reduce other horizontal banding and other artifacts.

Such other banding arises in at least the two ways outlined in the "BACKGROUND" section of this document, namely printhead nozzle misdirections in the paper axis and swath-height errors (SHE or SWE). These artifacts too are effectively reduced through use of a compensation algorithm based on white-drop mask generation.

As noted earlier, these are not intrinsically localized with respect to all swaths—for example, not a priori in a coalescence-defined strip along each boundary—as in the case of boundary artifacts. Once established, however, as they derive from phenomena associated with specific nozzles they are generally repetitive in location with respect to a swath.

Similarly the intensity of each such artifact is not known a priori. It is, however, often generally repetitive over at least short times such as days or weeks.

(b) Adaptive white-drop correction—Accordingly for these artifacts, as compared with boundary artifacts, a principal point of departure is that an exact artifact profile of intensity vs. location must first be discovered, for each set of printheads in each printer, before the artifacts can be corrected. Swath banding occurs in a statistical pattern that depends mostly on heater firing error, nozzle occlusion or misdirection, machine advance error and ink-media effects (coalescence).

These causative factors as such need not be known; only the present pattern is required. It can be readily determined by preexisting calibration equipment and procedures in at least high-end inkjet printers. Various alternative techniques for making such determinations are introduced in several of the earlier-listed related patent documents, including e.g. to various degrees those of Baker, Bockman, Borrell (Ser. No. '858), Soler and Subirada.

Two such procedures, for example, measure pen health and printing-medium advance errors; these protocols are easily invoked, and their measurement results straightforwardly redirected to control of white-drop mask generation. The overall procedure is adaptive in the sense that it adapts printer operation to any current, arbitrary set of artifact profiles—including boundary artifacts, so that ordinarily only the adaptive system need be operated.

Preferred embodiments thus include obtaining information about current banding patterns—or if desired a simulation of the human perception of those patterns—and then, based on this information, controlling the generation of printing masks.

The measurement and control loop can be operated at the beginning of each plot, or each group of plots of a different type from a preceding group, or each day or week, etc.—all depending upon the user's preferred tradeoff between convenience and overall quality. As noted above, most typically the machine conditions giving rise to these types of banding are relatively stable over periods of days and weeks; however, if machines are used for hardcopies to be sold at professional prices—or in any event if fine-art results are expected—recalibration on a per-plot basis is probably justified.

With this information, the mask generator is able to produce different white-drop masks for each pen, adjusting the blank generation to the status of the pens and the cumulative banding of the print mode. In other words, the white-drop mask is adapted to the pen-to-pen, machine-to-machine and printmode-to-printmode variability.

As to swath-height error, the effects of the previously discussed variability between swath height and print-medium advance are detected and measured by the calibration process of the machine, for passage to the mask generator. The result is to withdraw more ink (FIG. 1B) or less ink (FIG. 1C) from the horizontal region, depending on the case. Analogous correction occurs for internal area-fill nonuniformity.

This approach avoids restrictions on operating modes, and avoids time-consuming calibrations. It is necessary only to scan one patch for each combination of colorant and paper advance. The mask-generation procedures of section 1 above are readily adapted to this case—the primary difference being that the desired depletion profile is found dynamically from the measurements rather than specified based upon boundary-banding observations at the factory or in development.

(c) Two-stage correction—Preferred embodiments of the invention compensate banding for each pen individually, through use of white-drop masks that can remove ink from dark striations 142 (FIG. 3A) and medium-dark striations 143 produced in a swath 140 by each colorant independently. Thus preferred embodiments of the present invention eliminate the previously discussed need to find a very delicate compromise among requirements of all the different pens.

The combination of all area-fill nonuniformities induces sensitive changes from the optical-density average, along the advance axis. When measured, these are usually found to be highly correlated to certain discrete low and high spatial-frequency bands.

Preferred embodiments of the invention measure these ink density variations and from them determine an optimum white-drop mask 144 (FIG. 3B) to compensate them. Again, this compensation is performed for each pen separately, not as a compromise.

This process produces a uniform area-fill profile 140" (FIG. 3C) at an ink density that is lower than nominal (some ink has been removed). Hence, in order to preserve the original color depth, in a second step 145 the ink limit is increased in proportion to (typically) an average of the withdrawn ink.

Figure 3:
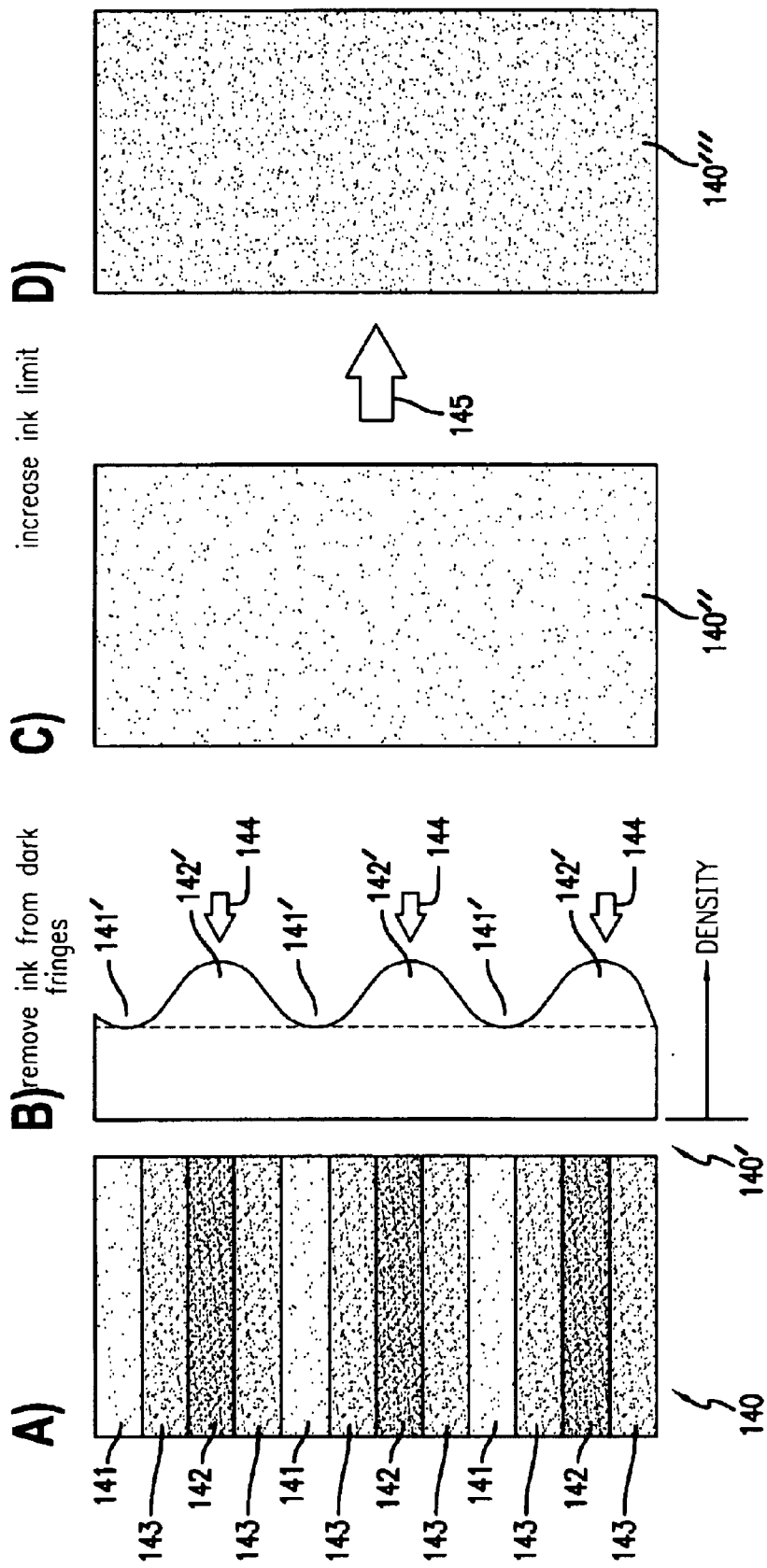
FIG. 3 is a set of four views illustrating a preferred two-stage operation of adaptive white-drop masking: in view A), a representative but exaggerated tonal pattern of artifacts; in view B), a corresponding graph of density along the axis of the view-A pattern, together with a representation of localized depletion applied to that varying density as a first-stage adjustment; in view C), a tonal pattern corrected ideally by that first-stage adjustment—namely, a uniform field; and in view D), the same tonal pattern after a second-stage ink-limit adjustment.

If the input (FIG. 3A) was a uniform area fill, the final result is a banding-corrected area fill 140''' (FIG. 3D). If the input was instead a desired image, the output is a banding-corrected version of that image, with the same two-stage corrections 144, 145 applied proportionally throughout.

(d) Signed correction—In another mode of use, banding is compensated through application of a signed adjustment—i.e. either negative or positive as appropriate to counter the algebraic sign of the banding error. Although this approach can deal with negative as well as positive banding, and may seem more direct, and also avoids the need for the second step just mentioned, it too has limitations.

A relatively simple one is the need to carry at least one additional bit to maintain the sign for each mask layer. One advantageous way of doing this is to add, for each operative mask layer, one additional mask layer for the sign. Each color-bit adjustment layer is then operated in accordance with the associated sign layer.

A more serious limitation is that for light striations it can no longer be assumed that high calorimetric values in the image—automatically selecting corresponding high mask layers—identify the locations where color adjustment is required. Hence the automatic scaling of quantity of ink removal or addition to underlying image intensity is absent.

As the assumed correlation with coalescence in heavy color-saturation regions no longer holds in such cases, inking must be adjusted independently of colorimetric saturation. Ink may therefore sometimes be removed or added in highlight regions of an image.

(e) Comparison with conventional depletion and propletion—The Borrell patent document mentions using the printmasking function to divide up propletion as between passes—or alternatively to put all his propletion drops in a separate pass from the conventional drops. He does not, however, use the printmasking function to define where (in which pixels) to position propletion drops.

In his system, that is determined by only the color values represented in the basic image file. In this regard his system is analogous to the earlier and more broadly used depletion functions: both localize based on image data alone.

Preferred embodiments of the present invention, to the contrary, use one or more printmasks as inking-adjustment-defining masks. Inserted bits do define exactly where and how much depletion or augmentation is to be applied, not merely in which pass. These embodiments exploit the very extensive programming and storage infrastructure established mainly for printmasking.

In some cases, the pattern of bits is positioned in those masks at the factory. This corrective pattern reflects foreknowledge of boundary-banding patterns and magnitudes.

In other cases a current pattern of artifacts and their magnitudes is instead acquired in the field by printing and scanning a test plot—through any of the several techniques discussed in related patent documents as mentioned earlier—and then inverted to obtain the corrective pattern. This correction pattern, as in the case described in the preceding paragraph, is then inserted into a mask or masks.

3. Composite-Color White-Drop and Adaptive Masking (a) Limitations of the white-drop technique—As pointed out in the "BACKGROUND" section, boundary artifacts associated with composite colors heretofore are even more difficult to remove than such artifacts associated with a single primary colorant. More specifically, as can now be appreciated, the white-drop masking and adaptive corrections as described in the foregoing two subsections cannot respond to composite colors as such.

They can respond only to high levels of inking specified in each one of the colorants considered separately, independently of the others. As the white-drop mask is activated through the multibit value of each pixel in a single color plane, it depends on the plane-specific output value of the multilevel error diffusion algorithm—and thus affects only swath boundary areas with high density of ink from a single pen.

White-drop masking as outlined above is excellent in negating boundary artifacts and other artifacts that happen to be visible in a single subtractive primary—and this is very common, accounting for a sizable fraction of the artifact occurrences. Composite colors, however, can be heavily inked in the aggregate without high saturation in any single primary.

In short, high-value color signals can speak to the white-drop masking system exclusively through just one color-signal channel at a time. In this case, as no single color channel has a high color signal, the high-saturation composite color has no way to talk to the white-drop masking system.

Consider the worst case, in which each pen in an N-pen-system contributes a single drop to the same pixel. Ordinarily one drop is not considered to cause enough coalescence to produce boundary artifacts. Therefore, for this particular highly saturated case (a total of N drops has been deposited) no depletion will occur with the current white-drop mask.

White-drop masking can properly correct boundary artifacts, and the other artifacts, in composite-color areas only when at least one channel has a high signal—not in general. Accordingly such masking still leaves the artifacts uncured in a significant fraction of occurrences.

A further limitation of the methods and systems just detailed is that the last level of the drop table is lost for a binary mask definition, as that level is diverted to service as a placeholder for the white drop mask. Though rarely more than two drops are fired in low-pass printmodes, in some cases this restriction may become critical.

(b) New color plane, rather than mask layer—Other preferred embodiments of the invention, however, do provide swath-localized ink depletion as a function of total ink amount deposited in a region—i.e., not only for the primary colors as achieved with white-drop masking but also for composite colors. These embodiments thus extend the benefits of white-drop masking into the composite-col- or regime, which is to say a sizable fraction of the printer gamut.

Figure 4:
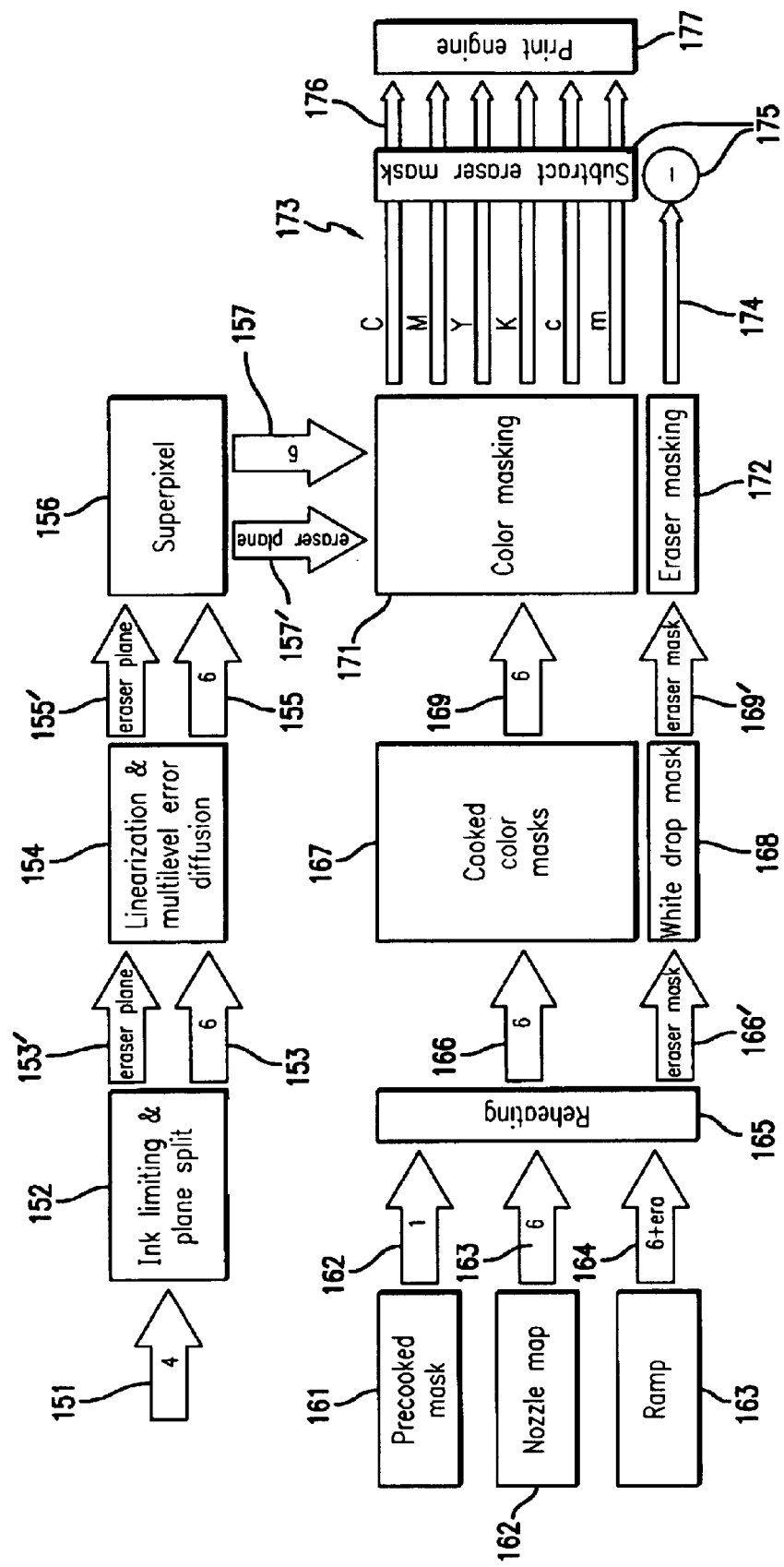
FIG. 4 is a flow chart showing the double-branch pipeline in a preferred embodiment of the eraser-plane form of the invention.

The data pipeline in an incremental printer is a parallel process. On one side 151–157 (FIG. 4) for example, the image to be printed is preprocessed; and on the other 161–169 the printmasks are prepared for the specific printing time, taking into account the nozzle health of each pen.

The two paths converge in a final color-masking module 171 that applies the masks 169 to the data 157. Carried along in parallel with the real color data and masks in all this processing, for purposes of preferred embodiments of the invention, are the "eraser" or "white-drop" functions:

These are, in the imaging subpipe, the eraser plane 153', 155', 157'; and in the masking subpipe, the white-drop mask 168, the eraser masking 172, and its application 174, 175 to the real color data. Preferably the eraser plane contains data derived from total inking, i.e. from consideration of all the real color planes as an aggregation (rather than for each plane individually). Therefore the eraser plane preferably responds to high inking in composite colors.

Apart from those eraser/white-drop functions, the system is substantially conventional: in the imaging subpipeline, typically four planes of image data 151 pass through the ink limiting and plane split processes 152, and then proceed 153 as six planes of data (plus the eraser plane), to the linearization and multilevel error diffusion unit 154. All these data undergo superpixeling 156 and then proceed 157 to the color data masking block 171.

Meanwhile in the masking subpipe, a so-called "precooked mask" 161 is held in nonvolatile memory—as set forth in the earlier-mentioned Garcia documents, particularly the '556 patent. A current nozzle map 162 has been acquired defining the state of health of each nozzle in the machine, and is combined with the precooked mask 161 and a color ramp 163 in a so-called "reheating" process 165.

The resulting so-called "cooked color masks" 167 are just as taught for the Shakes system and precooked masking in the earlier documents—except for inclusion of the white-drop mask 168. All seven masks are passed 169, 169' to the color data masking stage 171, to meet the image data 157 from the halftoning subpipe 151–157.

At that particular stage the white-drop mask 168 is convolved with the eraser plane in an integrated eraser-masking function 172. It is at precisely this point that the system becomes capable of identifying high inking in swath-localized artifact regions. Furthermore, because the eraser plane responds to composite colors, the system at this convergence point becomes capable of identifying high composite-color inking in swath-localized artifact regions.

In preferred embodiments, the color-masking stage proper 172 and six real colorant data planes 173 analogously depart from the conventional at the point of their application 176 to the print engine 177. At that stage, again in preferred embodiments, the innovation includes the presence of the previously mentioned eraser-mask subtraction stage 175.

As the foregoing basic white-drop details (sections 1 and 2 above) illustrate, an algorithm for localized banding suppression can take into account both the halftoning and the printmode information—so that printmasks are depleted at swath boundaries only if a high inking level is present. The image pipeline considered alone is totally ignorant of the printmode parameters: it has no access to information about where swath boundaries will occur; and conversely, the printmask system is ignorant of inking for a particular image.

Preferred embodiments of basic white-drop masking adopt a breakthrough philosophy, namely coordination of information from the two parallel processes to enable localized depletion. For preferred embodiments of a composite-color extension as set forth in this section 3, that basic white-drop philosophy of printmask manipulation based upon inking levels is retained—but applied at a different tier in the pipeline.

Whereas basic white-drop details presented earlier (section 1 and 2) focus on availability of a seldom-used mask layer, preferred embodiments of the composite-color extension abandon that formulation in favor of a wholly new, artificial dimensionality in the machine color space. One or more additional eraser color planes are introduced 153', 164, 166' into both the imaging and masking branches of the pipeline, together with the typically six planes of real color and masking data—basically providing bookkeeping pages in which to do the necessary accounting.

The added plane or planes—rather than defining (as do the conventional planes) what color is desired or what ink must be provided to implement that color—instead define where and how much ink is to be withdrawn. This definition is formulated depending on both the swath positioning, known to the printmasking system; and the information about the total ink amount that is otherwise specified for a given position, known to the halftoning system. Often the latter information is already available within an ink-limiting (depletion) algorithm, which is a part of the halftoning modules.

The point at which the eraser plane is introduced into the pipeline is subject to competing considerations. As with conventional color planes, data in the eraser plane or planes pass through all processing stages downstream from the eraser-plane introduction point to the printing entry—in both branches of the pipe. Consequently, designing the introduction point to occur relatively far upstream increases the computational load on the system.

In the data pipelines of Hewlett Packard products, computational burden after the printing-entry point 171, 172 (FIG. 4) is independent of the introduction-point selection—because after printing entry each plane is masked independently anyway.

Parallel to the eraser-plane introduction in the image subpipe, as described above, an "eraser mask" (white-drop mask) is introduced 164, 168 in the masking subpipe. In a general way this introduction point is coordinated with that of the eraser plane, and computational burden on the masking side generally tracks the selection of introduction point in the image side; however, as a general rule the total computation in masking is a very small fraction of that in image rendering.

Each candidate introduction point offers a different compromise between processing time and memory management:

Before 153 multilevel error-diffusion 154—
  Introduction of the "eraser plane" at this level is computationally less efficient, but offers a better antipatterning robustness as the eraser-plane data experience the error-diffusion process.
After superpixeling and before printing—
  This option (not shown) is computationally more efficient, because data in the new plane pass through little or no further processing before printing; however, it might be less stable with regard to patterning as the previous one.

Just before printing, preferred embodiments of this form of the invention have the six masked color planes 173 supplied conventionally, plus at least one additional masked eraser plane 174 that describes how much total ink to withdraw at a given, printmode-dependent position.

(c) Subtractive application—At the end of the pipeline, after the localized depletion profiles have been defined as described above, the eraser plane 174 is subtracted 175 from the real color planes 173. That is, the data sent to the printheads will not be those in the masked color planes 173, but rather those minus the masked eraser plane 174.

The eraser data, like the white-drop mask data discussed earlier, are not necessarily simple binary. They may instead be multilevel data, in keeping with the potential desirability of graduated depletion—all in accordance with the character of the adaptive-correction measurement results.

In this way, final data are generated dynamically taking into account both position within a swath and the total ink amount at that position. A favorable choice of introduction point, for inserting the eraser plane into the imaging and masking pipelines, is within the plane-split and ink-limiting process 152.

(d) Overview—At the expense of some additional processing time or memory usage, or both, preferred embodiments of this form of the invention provide advantages over the basic white-drop implementation detailed earlier. The most important advantage is extension of white-drop technique to composite colors. The basic ink-level-dependent, swath-localized depletion can now be achieved readily for composite colors as well as primaries.

Another advantage is introduction of a more flexible, algorithmic ink-level dependence that is no longer tied to the linearization thresholds of the multilevel error diffusion process, and is therefore resolution independent. Yet another is the extension or even replacement of conventional depletion procedures.

Still another is preservation of the last level of the drop table for conventional use. That level can be returned to its native function of resolving highly saturated colorimetric levels.

Further, preferred embodiments of this form of the invention enable a reduced requirement of processing just one white-drop mask, rather than one for each color. As suggested earlier, plural eraser planes and plural white-drop masks are within the scope of the invention—and in fact may be useful for artifacts of particular chromatic character—but are not necessary in fundamental practice of the composite-color extension.

(e) Masking details—A multibit pipeline is needed to define a white-drop mask. Normally, two bits are used per pixel, which gives us three nonzero levels: 01, 10 and 11. These three levels are mapped to one or two drops before entering the color masking module.

The previous mapping was:

| | |
|---|---|
| level 01 | 1 drop |
| level 10 | 1 drop |
| level 11 | 2 drops. |

This yields an input of the color-masking algorithm in drops per pixel for a real "color" plane (CLRMAT). For example, now assuming a pen of only three nozzles and this arbitrary pattern of bits for a sample image, the color plane can be:

Using a simple checkerboard mask in a two-pass printmode to illustrate the example:

for the first drop (CLRMSK)—

```
1 2 1 2 1 2
2 1 2 1 2 1
1 2 1 2 1 2;
``` for the second drop (complementary to the first drop mask)—

```
2 1 2 1 2 1
1 2 1 2 1 2
2 1 2 1 2 1.
```

When sent to the printer pens in binary form, the foregoing sample image masked by these masks produces these inkings:

for the first pass—

```
1 0 1 1 0 1
0 1 0 1 0 0
1 0 1 0 0 0;
``` for the second pass—

```
0 1 0 1 0 1
1 0 0 0 1 0
0 1 1 0 0 1.
```

This means that, in the bottom-right pixel, the first drop is going to be fired on pass 2, and the second one on pass 1. As the amount of drops to be fired is one, however, a drop is deposited at this pixel location in pass 1 only. At the top-right pixel, where the drop value is two, a drop is deposited in both passes 1 and 2.

Now, preferred embodiments of the white-drop expansion for composite colors introduce an additional eraser plane, which is built with a certain functional dependence from the normal color planes. One very straightforward function is the normalized sum of the Contone values v of the several color planes, $(v_C+v_M+v_Y+v_K+v_{LM}+v_{LC})/6$; however, any dependence appears to be possible if the final result is in effect normalized to the value range of the Contone planes.

Once introduced, as pointed out earlier the eraser plane undergoes the same processing as the real color planes: linearization, multilevel error diffusion (halftoning), and superpixeling. The final result is a matrix containing the number of negative drops that are actually to be subtracted at each pixel.

Following is an example of an eraser plane—not the white-drop mask or the final depletion matrix, but rather only the eraser plane that establishes heavy-inking locations. Although arbitrary, this example could in principle be associated with the sample single color plane shown above. The sample eraser plane shown here is the input of the color-masking algorithm in drops per pixel:

eraser plane (EPMAT)—

```
1 0 1 1 0 2
0 1 0 2 1 0
0 1 1 0 0 0.
```

From the printmode path of the pipeline a white-drop mask is created for the eraser plane. Although this mask could also be a multilevel one, for linear subtraction a binary mask with only one plane is required that defines the swath region from which ink is to be depleted. Here is an example of such a mask:

white mask (WDMSK)—

```
1 1 1 1 1 1
1 0 1 0 1 0
0 0 0 0 0 0.
```

This binary white-drop mask (WDMSK) is multiplied by the eraser-plane matrix (EPMAT), and the product subtracted from the real color plane matrix (CLRMAT):

| CLRMAT | - | WDMSK*EPMAT | - | | | |
|---|---|---|---|---|---|---|
| 111202 |   | 101102 |   | 111111 |   | 111202 |
| 010110 | − | 010210 | * | 101010 | = | 010110 |
| 112001 |   | 011000 |   | 000000 |   | 112001 |

| − | 101102 | = | 010100 |
|---|---|---|---|
|   | 000010 |   | 010100 |
|   | 000000 |   | 112001. |

The eraser-plane matrix holds information about the number of drops that could be deleted; and the binary-white-drop mask, information about positions at which to delete them. The previous result is then sent to the printer masked with the real color plane mask (CLRMSK), which yields (CLRMAT−WDMSK*EPMAT)*CLRMSK:

for the first pass—

```
0 0 0 0 0 0
0 1 0 1 0 0
1 0 1 0 0 0;
``` for the second pass—

```
0 1 0 1 0 0
0 0 0 0 0 0
0 1 1 0 0 1.
```

This is only one preference for the functionality of plane subtraction. Others can be considered.

If the white-drop mask is not simple binary but instead a multilevel mask like that for a real color plane, a different arithmetic can be defined to offset the planes from each other, e.g. (CLRMAT*CLRMSK−WDMSK*EPMAT). The result (whether desired or undesired) of this approach is to delete drops depending on the pass in which they are fired.

For example one drop can be deposited in the first or second pass, and erased from the first or second pass respectively. Observing the arithmetic just stated, masking will not operate if formulated to violate this rule—e.g. to erase in the second pass a drop deposited in the first, or vice versa.

Such a drop will finally be deposited, not erased. Interestingly, this behavior does not fully meet the initial inventive intent; however, it does allow potentially useful plane-dependent combinations between the masks.

If the white-drop mask is a multilevel mask and an objective is to assure that a drop will always be deleted when deletion is specified—independently of the pass in which it is fired—then the white-drop mask must be dependent on the real color mask. As there are different real color masks, this implies that for this purpose a white-drop mask should be associated with each real color mask; this technique does work, though at the cost of additional memory overhead.

4. Hardware for Preferred Basic White-Drop Masking

Subsection 3(b) above describes processing hardware for preferred embodiments of the eraser-plane form of the invention. That section does not take up print-engine details, which are substantially the same as described in this section for preferred embodiments of basic white-drop masking.

As preferred embodiments of the invention are amenable to implementation in, or as, any one of a very great number of different printer models of many different manufacturers, little purpose would be served by illustrating a representative such printer. If of interest, however, such a printer and some of its prominent operating subsystems can be seen illustrated in several other patent documents of the assignee, Hewlett Packard—such as for example the previously mentioned document of Antoni Gil Miquel, which particularly illustrates a large-format printer-plotter model.

Figure 5:
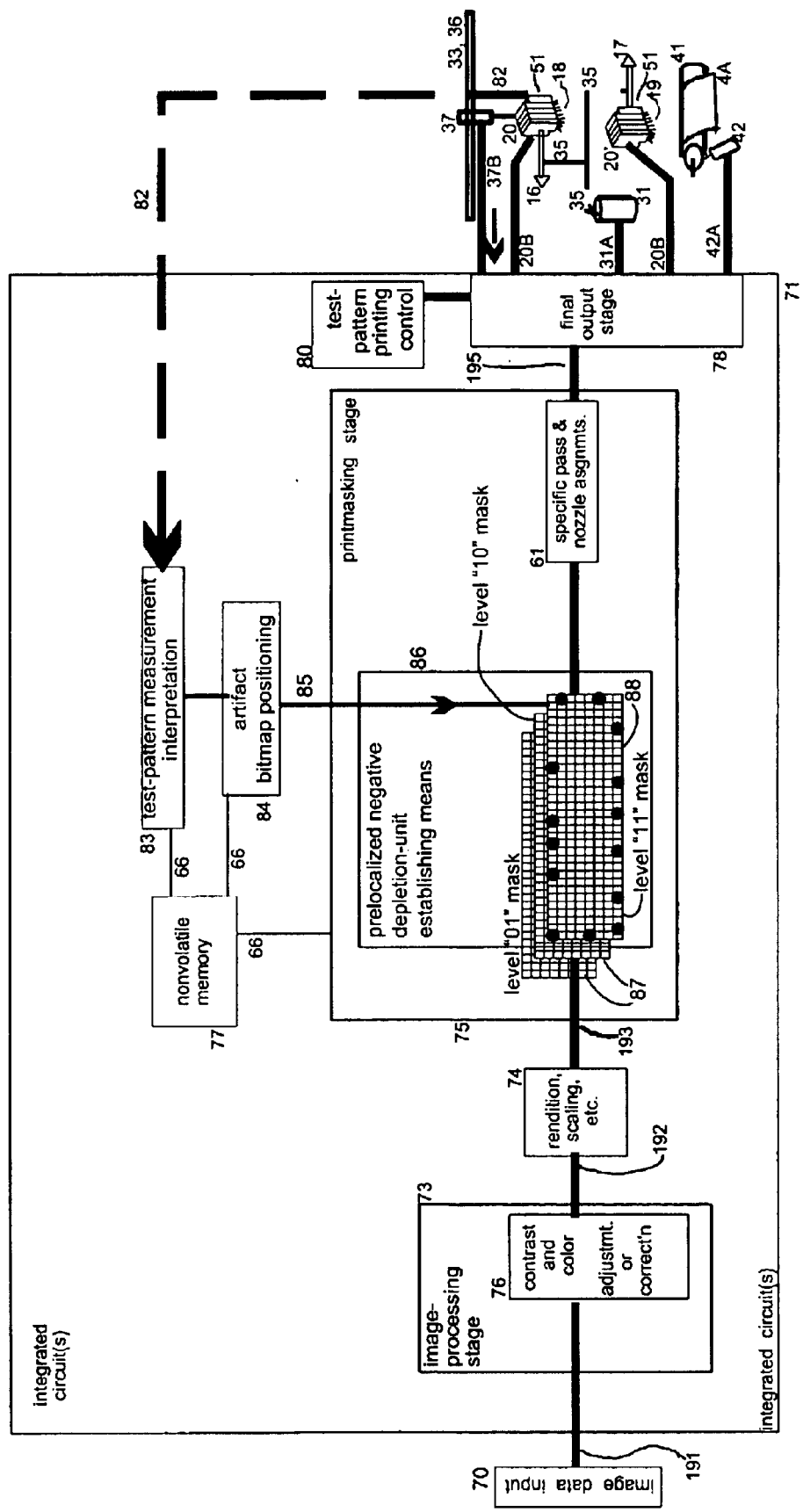
FIG. 5 is a block diagram of a preferred embodiment of the basic white-drop-masking form of the invention, including a print engine with scanning printheads.

In some such representative printers, a cylindrical 9 platen 41 (FIG. 5)—driven by a motor 42, worm and worm gear (not shown) under control of signals from a digital electronic processor 71—rotates to drive sheets or lengths of printing medium 4A in a medium-advance direction. Print medium 4A is thereby drawn out of a supply of the medium and past the marking components that will now be described.

A pen-holding carriage assembly 20 carries several pens, as illustrated, back and forth across the printing medium, along a scanning track—perpendicular to the medium-advance direction—while the pens eject ink. For simplicity's sake, only four pens are illustrated; however, as is well known a printer may have six pens or more, to hold different colors—or different dilutions of the same colors as in the more-familiar four pens. The medium 4A thus receives inkdrops for formation of a desired image.

A very finely graduated encoder strip 33, 36 is extended taut along the scanning path of the carriage assembly 20 and read by a very small automatic optoelectronic sensor 37 to provide position and speed information 37B for one or more microprocessors 71 that control the operations of the printer. One advantageous location for the encoder strip, shown in earlier coowned patent documents of the assignee, is immediately behind the pens.

A currently preferred position for the encoder strip 33, 36, however, is near the rear of the pen carriage remote from the space into which a user's hands are inserted for servicing of the pen refill cartridges. For either position, the sensor 37 is disposed with its optical beam passing through orifices or transparent portions of a scale formed in the strip.

The pen-carriage assembly 20, 20' is driven in reciprocation by a motor 31—along dual support and guide rails (not shown)—through the intermediary of a drive belt 35. The motor 31 is under the control of signals from the processor or processors 71.

Preferably the system includes at least four pens holding ink of, respectively, at least four different colors. Most typically the inks include yellow Y, then cyan C, magenta M and black K—in that order from left to right as seen by the operator.

As a practical matter, chromatic-color and black pens may be in a single printer, either in a common carriage or plural carriages. Also included in the pen-carriage assembly 20, 20' is a tray carrying various electronics.

Preferred embodiments of the invention are not limited to practice with a scanning-pen system. They may instead use a pagewide swath-height array 92 (FIG. 6), with many nozzles 91. The printing medium 4A and the array 92 can undergo relative motion.

For instance the pagewide array ordinarily is successively displaced in an advance direction 42' by a printing-medium advance system—or the array may be moved in an opposite direction over the medium. Such a system can be closely analogous to that shown in the print-engine section of FIG. 5.

In this way the pagewide array 92 (FIG. 7) can print in a plural-installment mode that deposits overlapped swaths 93, 94, ..., to complete the image in areas 95 not yet reached by the array 92, or in a single-installment mode with successive swaths abutted. Furthermore it may operate in a plural-installment mode that fires plural times between printing-medium advances, printmasked to avoid presence of excess liquid all on the page at once.

Before further discussion of details in the block diagram (FIG. 5), a general orientation to that drawing may be helpful. Conventional portions of the apparatus appear as the printing stage 20 through 51, and 4A, discussed above, and also the final output-electronics stage 78 which drives that printing stage. This final-output stage 78 in turn is driven by a printmasking stage 75, which allocates printing of ink marks 18, 19 as among plural passes of the carriage and pens 20, 20' across the medium 4A.

Also generally conventional is a nonvolatile memory 77, which supplies operating instructions 66 (many of which are novel and implement preferred embodiments of the present invention) for all the programmed elements. Four-color image data 70, at far left in the diagram, flow as input signals 191 into the processor 71.

Features particularly related to preferred embodiments of the apparatus aspect of the invention appear in the central region of the diagram as elements 82 through 86, and 88, though features 87 are generally conventional. All these will be detailed below. Given the statements of function and the diagrams presented in this document, a programmer of ordinary skill—if experienced in this field—can prepare suitable programs for operating all the circuits.

Conventional features also include test-pattern control circuitry 80. This module is used for generating test patterns for other calibration functions and the like, as is a data path 82 for information that results from reading of test patterns by a small calorimeter sensor 51, or the like, that also travels on or with the pen carriage. The use of the sensor output signal, however, is part of preferred embodiments of the present invention and will be detailed shortly.

The pen-carriage assembly is represented separately at 20 when traveling to the left 16 while discharging ink 18, and at 20' when traveling to the right 17 while discharging ink 19. Both callouts 20 and 20' represent the same pen carriage, with the same pens.

The previously mentioned digital processor 71 provides control signals 20B, 20'B to fire the pens with correct timing, coordinated with platen drive control signals 42A to the platen motor 42, and carriage drive control signals 31A to the carriage drive motor 31. The processor 71 develops these carriage drive signals 31A based partly upon information about the carriage speed and position derived from the encoder signals 37B provided by the encoder 37.

New image data 70 are received 191 into an image-processing stage 73—which includes a contrast and color adjustment or correction module 76—and a rendition module 74 using dithering or error diffusion to determine a tone value to be printed at each pixel. Additional conventional processing stages may be included, and the drawings are to be interpreted as showing such other conventional stages such as ink limiting (e.g. conventional depletion), color-saturation enhancement (e.g. propletion) and various other forms of signal modification in incremental printing, whether or not now known.

The integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e.g. the central processor of a general-purpose computer) operating software such as may be held for instance in a computer hard drive, or operating firmware (e.g. held in a ROM 77 and for distribution 66 to other components), or both; and may comprise application-specific integrated circuitry. Combinations of these may be used instead.

Now as to nonconventional details: data from the scanning sensor 51 pass to a test-pattern interpretation algorithm 83, for use in determining positions and intensities of artifacts relative to basic swaths. These artifact data in turn are used in a module 84 that directly generates corrective bitmap patterns.

As to data taken in the field, these patterns may be representative of artifacts other than boundary artifacts; and the boundary artifacts patterns may be found at the factory or in the laboratory as part of the printer design process. Alternatively, the boundary artifact patterns too may be determined in the field.

The corrective bits are stored in a mask layer 88 that is most preferably the high-level mask—e.g. a level "11" mask as discussed previously. This mask layer 88 is regarded as signed, i.e. as containing negative drops so that the contents of this mask layer essentially subtract from the contents of the two layers.

This single mask layer thereby becomes the heart of the depletion-unit establishing means 86, introduced earlier. It, together with the four-state drop table and arithmetic implied thereby, accomplishes both the discrimination function and the correction function.

The other, lower masks 87, however, are not part of the depletion-unit establishing means at all—they are entirely conventional printmasks in both form and function. As will now be startlingly clear, preferred embodiments of basic white-drop masking accomplish a remarkably large task with a remarkably little resource: typically just one third of a three-level printmask.

This is a very elegant and powerful technique.

The above disclosure is intended as merely exemplary, and not to limit the scope of the invention—which is to be determined by reference to the appended claims.

What is claimed is:

1. A method for operating an ink-swath system that has a printmasking function to print an image; said method comprising the steps of:
   identifying a portion of the image that has high color saturation along at least one swath boundary; and
   printing the image with ink depleted selectively in the identified portion; and wherein:
   the identifying step comprises locating the swath boundary through the printmasking function.

2. The method of claim 1, wherein:
   the system has a printmasking function for use even in a single-pass printmode.

3. The method of claim 1, wherein:
   said locating comprises selecting swath positions identified in printmasks.

4. The method of claim 3, wherein:
   said selecting comprises applying a printmask layer that has bits selectively positioned near the swath boundary.

5. The method of claim 1, wherein:
   the identifying step comprises determining high color saturation through application of a depletion-localizing mask layer.

6. The method of claim 5, wherein:
   said determining comprises operating the depletion-localizing mask layer am a highest-value mask layer.

7. The method of claim 6, wherein:
   said operating comprises applying the depletion-localizing mask layer subtractively.

8. The method of claim 5, wherein:
   said determining comprises applying the depletion-localizing mask layer only for pixels allocated maximum inking in at least one color plane.

9. The method of claim 8, wherein:
   said applying comprises using the depletion-localizing mask layer subtractively.

10. The method of claim 5, wherein:
    said locating comprises using said depletion-localizing mask layer, with bits selectively positioned near the swath boundary.

11. The method of claim 1, wherein;
    the identifying step comprises selection of pixels having maximum inking in at least one color plane.

12. A method for printing an image with a printer that has a printmasking function; said method comprising the steps of:
    using the printmasking function to define depletion regions; and
    printing the image with ink depleted selectively in the regions.

13. The method of claim 12, wherein:
    the using step comprises establishing an auxiliary printmask to define the regions.

14. The method of claim 12, for use if the system forms the image in swaths of ink; and wherein:

the using step comprises defining depletion regions near at least one swath boundary that is identified through the printmasking function.

15. The method of claim 14, wherein:

said defining comprises establishing the regions near the swath boundary by bits selectively positioned in at least one printmask.

16. The method of claim 15, wherein:

the using step comprises defining depletion regions at pixels of high color saturation through application of a depletion-localizing mask layer.

17. The method of claim 16, wherein:

said application comprises operating the depletion-localizing mask layer as a highest-value mask layer.

18. The method of claim 17, wherein:

said operating comprises applying the depletion-localizing mask layer subtractively.

19. The method of claim 12, wherein:

the using step comprises applying a depletion-localizing mask layer subtractively.

20. The method of claim 12:

further comprising the step of measuring test-plot optical-density nonuniformity arising from any or all of these types of defects or artifacts and others that introduce nonuniformity: boundary artifacts, swath-height error, printing-medium advance error, bidirectional banding, minibanding, and area-fill nonuniformity; and wherein the using step comprises defining, through the printmasking function, depletion regions and magnitudes that compensate for the measured nonuniformity.

21. The method of claim 20, wherein:

the using step tends to correct all said defects or artifacts for each color plane independently.

22. The method of claim 20, further comprising the step of:

raising an ink-limit value to compensate for overall underinking effects of said defining.

23. A method for printing an image with a printer that has a printmasking function; said method comprising the steps of:

measuring test-plot optical-density nonuniformity;

using the printmasking function to define ink-adjustment regions and magnitudes to compensate for the measured nonuniformity; and printing the image with ink adjusted selectively in the regions and according to the magnitudes.

24. The method of claim 23, wherein:

the measuring step responds to nonuniformity arising from any or all of these types of defects or artifacts and others that introduce nonuniformity: boundary artifacts, area-fill nonuniformity, swath-height error, printing-medium advance error, minibanding and bidirectional banding.

25. The method of claim 23, wherein:

the using step tends to correct all said defects or artifacts for each color plane independently.

26. Apparatus for printing an image in ink-drops, subject to mechanical artifacts; said apparatus comprising:

means for establishing units of ink depletion, prelocalized with respect to such artifacts and manipulated as negative inkdrops, and a print engine for printing the image with the drops and depletion units.

27. The apparatus of claim 26, when used for printing the image in plural successive inking installments; and further comprising:

means for allocating each inkdrop to one of the installments, respectively; and means for allocating at least some of the units of ink depletion to one of the installments, respectively;

wherein the engine prints the image with the drops and units as allocated to the installments.

28. The apparatus of claim 27, wherein the depletion-allocating means comprise:

bits selectively positioned in at least one printmask to define a depletion region with respect to a swath of inkdrops.

29. The apparatus of claim 28, wherein the printmask comprises:

at least one depletion-localizing mask layer, containing said bits, that is invoked only at pixels of high color saturation.

30. The apparatus of claim 29, wherein:

the depletion-localizing mask layer is a highest-value mask layer.

31. The apparatus of claim 26, wherein the depletion units comprise:

at least one depletion-localizing mask layer that is invoked only at pixels of high color saturation.

32. The apparatus of claim 26, wherein the print engine comprises:

for each colorant that is in use, a scanning array of inking units; and a firing system for providing signals to operate the array.

33. The apparatus of claim 26, wherein the print engine, comprises:

a pagewide array of inking units, having multiple inking rows for inking, in each colorant that is in use, a pagewide swath; and a firing system for providing signals to operate the array.

34. The apparatus of claim 33, further comprising:

means for shifting such printing medium along a medium-advance axis between successive inking installments, or successive groups of inking installments, of the array.

* * * * *